United States Patent
Giannakis et al.

(10) Patent No.: US 7,590,188 B2
(45) Date of Patent: Sep. 15, 2009

(54) CHANNEL ESTIMATION FOR BLOCK TRANSMISSIONS OVER TIME- AND FREQUENCY-SELECTIVE WIRELESS FADING CHANNELS

(75) Inventors: Georgios B. Giannakis, Minnetonka, MN (US); Xiaoli Ma, Auburn, AL (US)

(73) Assignee: Regents of the University of Minnesota, Minneapolis, MN (US)

( * ) Notice: Subject to any disclaimer, the term of this patent is extended or adjusted under 35 U.S.C. 154(b) by 799 days.

(21) Appl. No.: 10/850,825

(22) Filed: May 21, 2004

(65) Prior Publication Data

US 2005/0002461 A1 Jan. 6, 2005

Related U.S. Application Data

(60) Provisional application No. 60/472,290, filed on May 21, 2003.

(51) Int. Cl.
*H04L 27/04* (2006.01)
*H04L 27/06* (2006.01)

(52) U.S. Cl. ...................... 375/295; 375/340

(58) Field of Classification Search .......... 375/130, 375/139, 147, 229, 231, 232, 233, 259, 260, 375/354, 362, 363, 135, 136, 146, 262, 265, 375/295, 296, 340, 341, 346, 348; 370/310, 370/328, 329, 331, 332, 333, 335, 351, 389, 370/431, 437, 464, 465, 470, 473, 476; 714/794, 714/795
See application file for complete search history.

(56) References Cited

U.S. PATENT DOCUMENTS

| 5,127,051 A | * | 6/1992 | Chan et al. ............. 375/348 |
|---|---|---|---|
| 6,088,408 A | | 7/2000 | Calderbank et al. |
| 6,188,717 B1 | | 2/2001 | Kaiser et al. |
| 6,441,786 B1 | | 8/2002 | Jasper et al. |
| 6,449,245 B1 | | 9/2002 | Ikeda et al. |
| 6,487,253 B1 | | 11/2002 | Jones, IV et al. |
| 6,707,856 B1 | | 3/2004 | Gardner et al. |

(Continued)

OTHER PUBLICATIONS

B.M. Hochwald et al., "Achieving Near-Capacity on a Multiple-Antenna Channel," IEEE Transactions on Communication, vol. 51, No. 3, pp. 389-399, Mar. 2003.

(Continued)

*Primary Examiner*—Young T. Tse
(74) *Attorney, Agent, or Firm*—Shumaker & Sieffert, P.A.

(57) ABSTRACT

Techniques are described for channel estimation of block transmissions over time- and frequency-selective wireless fading channels. A wireless transmitter forms blocks of symbols that include at least two blocks of training symbols separated by at least one information-bearing symbol. Each block of training symbols comprises a first block of zero symbols and a second block of zero symbols separated by at least one training symbol. Each block of training symbols is equally long and equally spaced between information-bearing symbols. The training and information-bearing symbols are transmitted with equal power, respectively. A wireless receiver receives a wireless transmission signal formed according to the blocks of symbols and forms an estimate of a wireless communication channel based on the training symbols within the received signal. The structure and selected parameters of the symbols enabling symbol detection and channel estimation to be decoupled at the receiver while maximizing the average capacity of the channel.

27 Claims, 12 Drawing Sheets

U.S. PATENT DOCUMENTS

| | | | |
|---|---|---|---|
| 6,850,481 | B2 | 2/2005 | Wu et al. |
| 6,865,175 | B1* | 3/2005 | Ritter .......................... 370/345 |
| 6,959,010 | B1* | 10/2005 | Bahrenburg et al. ........ 370/503 |
| 7,065,371 | B1* | 6/2006 | Kleinerman ................ 455/464 |
| 7,161,973 | B2* | 1/2007 | Ghosh ......................... 375/147 |
| 2002/0122502 | A1 | 9/2002 | El-Gamal et al. |
| 2002/0126740 | A1 | 9/2002 | Giannakis et al. |
| 2002/0136327 | A1 | 9/2002 | El-Gamal et al. |
| 2002/0146078 | A1 | 10/2002 | Gorokhov et al. |
| 2003/0072452 | A1* | 4/2003 | Mody et al. .................. 380/274 |
| 2003/0081569 | A1* | 5/2003 | Sexton et al. ............... 370/329 |
| 2003/0156594 | A1* | 8/2003 | Trott et al. .................. 370/442 |
| 2003/0169824 | A1 | 9/2003 | Chayat |
| 2004/0013211 | A1* | 1/2004 | Lindskog et al. ............ 375/347 |
| 2004/0037214 | A1 | 2/2004 | Blasco Claret et al. |
| 2005/0058217 | A1 | 3/2005 | Sandhu et al. |

OTHER PUBLICATIONS

G.J. Saulnier et al, "Performance of an OFDM Spread Spectrum Communications system Using Lapped Transforms," in Proc. MILCOM Conf., vol. 2, 1997, pp. 608-612.

G.J. Saulnier et al., "Performance of a Spread Spectrum OFDM System in a Dispersive Fading Channel with Interference," in Proc. MILCOM Conf., vol. 2, 1998, pp. 679-683.

I. Koffman et al., "Broadband Wireless Access Solutions Based on OFDM Access in IEEE 802.16," IEEE Communications Magazine, vol. 40, No. 4, pp. 96-103, Apr. 2002.

L. Wei et al., "Space-Time-Frequency Block Coding Over Rayleigh Fading Channels For OFDM Systems," Proceedings of the International Conference on Communication Technology, ICCT 2003, vol. 2, pp. 1008-1012, Apr. 2003.

L. Wei et al., "Synchronization Requirements for Multi-user OFDM on Satellite Mobile and Two-Path Rayleigh Fading Channels," IEEE Transactions on Communications, vol. 43, No. 2/3/4, pp. 887-895, Feb.-Apr. 1995.

N. Yee et al., "BER of Multi-Carrier CDMA in an Indoor Rician Fading Channel," Conference Record of the Twenty-Seventh Asilomar Conference on Signals, Systems and Computers, pp. 426-430, 1993.

P. Xia et al., "Bandwidth-and Power-Efficient Multicarrier Multiple Access," IEEE Transactions on Communications, vol. 51, No. 11, pp. 1828-1837, Nov. 2003.

S. Kaiser et al., "A Flexible Spread-Spectrum Multi-Carrier Multiple-Access System for Multi-Media Applications," in Procedures of 8$^{th}$ IEEE International Symposium PIMRC, vol. 1, 1997, pp. 100-104.

S. Zhou et al, "Frequency-Hopped Generalized MC-CDMA for Multipath and Interference Suppression," in Proc. MILCOM Conf., vol. 2, Los Angeles, CA Oct. 22- 25, 2000, pp. 937-941.

W.Y. Zou et al., "COFDM: an Overview," IEEE Transactions on Broadcasting, vol. 41, No. 1, pp. 1-8, Mar. 1995.

Y. Xin et al., "Space-Time Constellation-Rotating Codes Maximizing Diversity and Coding Gains," in Procedures of Global Telecommunications Conference, Nov. 2001, pp. 455-459.

Z. Wang et al., "Complex-Field Coding for OFDM Over Fading Wireless Channels," IEEE Transactions on Information Theory, vol. 49, No. 3, pp. 707-720, Mar. 2003.

Z. Wang et al., "Joint Coding-Precoding with Low-Complexity Turbo Decoding," IEEE Transactions on Wireless Communications, vol. XXX, No. XXX, pp. 1-11, 2003.

M. Guillaud et al., "Multi-Stream Coding for MIMO OFDM Systems With Space-Time-Frequency Spreading," Wireless Personal Multimedia Communications, the 5$^{th}$ International Symposium, vol. 1, pp. 120-124, Oct. 27-30, 2002.

Y. Gong et al., "Space-Frequency-Time Coded OFDM for Broadband Wireless Communications," Global Telecommunications Conference, GLOBECOM '01, IEEE, vol. 1, pp. 519-523, Nov. 25-29, 2001.

Zhengdao Wang et al., "Linearly Precoded or Coded OFDM Against Wireless Channel Fades?," Third IEEE Signal Processing Workshop on Signal Processing Advances in Wireless Communications, Taoyuan, Taiwan, pp. 267-270, Mar. 20-23, 2001.

Srihari Adireddy et al., "Optimal Embedding of Known Symbols for OFDM," in Procedures International Conference, ASSP, vol. 4, Salt Lake City, UT, May 2001.

Yan Xin et al., "Space-Time Diversity Systems Based on Linear Constellation Precoding," IEEE Transactions on Wireless Communications, vol. 2, No. 2, pp. 294-309, Mar. 2003.

Yan Xin et al., "Space-Time Diversity Systems Based on Unitary Constellation-Rotating Precoders," in Procedures International Conference, Speech, Signal Process., Salt Lake City, UT, pp. 2429-2432, May 7-11, 2001.

Alexandra Duel-Hallen et al., "Long-Range Predication of Fading Channels," IEEE Signal Processing Magazine, pp. 62-75, May 2000.

Anastasios Stamoulis et al., "Block FIR Decision-Feedback Equalizers for Filterbank Precoded Transmissions with Blind Channel Estimation Capabilities," IEEE Transactions on Communications, vol. 49, No. 1, pp. 69-83, Jan. 2001.

Anders Furuskar et al., "EDGE: Enhanced Data Rates for GSM and TDMA/136 Evolution," IEEE Personal Communications, vol. 6, No. 3, pp. 56-66, Jun. 1999.

Amos Lapidoth et al., "Fading Channels: How Perfect Need "Perfect Side Information" be?," in Procedures IEEE Information Theory Communications Workshop, pp. 36-38, Jun. 1999.

Ayman F. Naguib et al., "Increasing Data Rate Over Wireless Channels," IEEE Signal Processing Magazine, vol. 17, pp. 76-92, May 2000.

Akbar M. Sayeed et al., "Joint Multipath-Doppler Diversity in Mobile Wireless Communications," IEEE Transactions On Communications, vol. 47, No. 1, pp. 123-132, Jan. 1999.

A.P. Clark et al., "Adaptive Channel Estimator for an HF Radio Link," IEEE Transactions On Communications, vol. 37, No. 9, pp. 918-926, Sep. 1989.

Anna Scaglione et al., "Filterbank Transceivers Optimizing Information Rate in block Transmissions Over Dispersive Channels," IEEE Transactions on Information Theory, vol. 45, No. 3, pp. 1019-1032, Apr. 1999.

Anna Scaglione et al., "Redundant Filterbank Precoders and Equalizers Part I: Unification and Optimal Designs," IEEE Transactions on Signal Processing, vol. 47, No. 7, pp. 1988-2022, Jul. 1999.

Anna Scaglione et al., "Redundant Filterbank Precoders and Equalizers Part II: Blind Channel Estimation, Synchronization, and Direct Equalization," IEEE Transactions on Signal Processing, vol. 47, No. 7, pp. 2007-2022, Jul. 1999.

B. Muquet et al., "Reduced Complexity Equalizers for Zero-Padded OFDM Transmissions," Procedures of International Conference on ASSP, vol. 5, pp. 2973-2976, Jun. 2000.

Babak Hassibi et al., "How Much Training Is Needed in Multiple-Antenna Wireless Links?" IEEE Transactions On Information Theory, vol. 49, No. 4, pp. 951-963, Apr. 2003.

Ben Lu et al., "Space-Time Code Design in OFDM Systems," in Procedures Global Telecommunications Conference, vol. 2, San Francisco, CA, pp. 1000-1004, Nov. 27-Dec. 1, 2000.

Cristian Budianu et al., "Channel Estimation for Space-Time Orthogonal Block Codes," IEEE Transactions on Signal Processing, vol. 50, No. 10, pp. 2515-2528, Oct. 2002.

C. Fragouli et al., "Finite-Alphabet Constant-Amplitude Training Sequence for Multiple-Antenna Broadband Transmissions," Procedures of IEEE International Conference on Communications, vol. 1, pp. 6-10, NY City, Apr. 28-May 1, 2002.

C. Fragouli et al., "Reduced-Complexity Training Schemes for Multiple-Antenna Broadband Transmissions," Procedure of Wireless Communications and Networking Conference, vol. 1, pp. 78-83, Mar. 17-21, 2002.

Cihan Tepedelenlioglu et al., "Transmitter Redundancy for Blind Estimation and Equalization of Time-and Frequency-Selective Channels," IEEE Transactions On Signal Processing, vol. 48, No. 7, pp. 2029-2043, Jul. 2000.

Dakshi Agrawal et al., "Space-Time Coded OFDM High Data-Rate Wireless Communication Over Wideband Channels," in Procedures on Vehicle Technology Conference, Ottawa, ON, Canada, pp. 2232-2236, May 18-21, 1998.

Deva K. Borah et al., "Frequency-Selective Fading Channel Estimation with a Polynomial Time-Varying Channel Model," IEEE Transactions On Communications, vol. 47, No. 6, pp. 862-873, Jun. 1999.

Dennis L. Goeckel, "Coded Modulation With Non-Standard Signal Sets for Wireless OFDM Systems," in Procedures International Conference Communications, Vancouver, BC, Canada, pp. 791-795, Jun. 1999.

Ezio Biglieri et al., "Fading Channels: Information-Theoretic and Communications Aspects," IEEE Transactions on Information Theory, vol. 44, No. 6, pp. 2619-2692, Oct. 1998.

Emanuele Viterbo et al., "A Universal Lattice Code Decoder for Fading Channels," IEEE Transactions on Information Theory, vol. 45, No. 5, pp. 1639-1642, Jul. 1999.

E. Lindskog et al, "A Transmit Diversity Scheme for Channels With Intersymbol Interference," Procedures of ICC, vol. 1, pp. 307-311, Jun. 2000.

Frederick W. Vook et al., "Transmit Diversity Schemes for Broadband Mobile Communication Systems," Procedures of IEEE VTC, vol. 6, pp. 2523-2529, 2000.

Fredrik Tufvesson et al., "OFDM Time and Frequency Synchronization by Spread Spectrum Pilot Technique," in Procedures $8^{th}$ Communication Theory Mini-Conference, Vancouver, BC, Canada, pp. 1-5, Jun. 1999.

Georgios B. Giannakis, "Cyclostationary Signal Analysis," The Digital Signal Processing Handbook, V.K. Madisetti and D. Williams, Eds. Boca Raton, FL: CRC, Chapter 17, 1998.

Georgios B. Giannakis et al., "Basis Expansion Models and Diversity Techniques for Blind Identification and Equalization of Time-Varying Channels," Proceedings of the IEEE, vol. 86, No. 10, pp. 1969-1986, Oct. 1998.

Georgios B. Giannakis, "Filterbanks for Blind Channel Identification and Equalization," IEEE Signal Processing Letters, vol. 4, No. 6, pp. 184-187, Jun. 1997.

Gerard J. Foschini, "Layered Space-Time Architecture for Wireless Communications in a Fading Environment When Using Multi-Element Antennas," Bell Labs Technical Journal, vol. 1, No. 2, pp. 41-59, 1996.

Ghassan Kawas Kaleh, "Channel Equalization for Block Transmission Systems," IEEE Journal on Selected Areas In Communications, vol. 13, No. 1, pp. 110-121, Jan. 1995.

H. Vincent Poor, "Probability of Error in MMSE Multiuser Detection," IEEE Transaction on Information Theory, vol. 43, No. 3, pp. 858-871, May 1997.

Helmut Bolcskei et al., "Blind Channel Identification and Equalization in OFDM-Based Multiantenna Systems,"IEEE Transactions on Signal Processing, vol. 50, No. 1, pp. 96-109, Jan. 2002.

Helmut Bolcskei et al., "Space-Frequency Coded Broadband OFDM Systems," Invited paper, presented at IEEE WCNC 2000, Chicago, pp. 1-6, Sep. 2000.

Helmut Bolcskei et al., "Space-Frequency Codes for Broadband Fading Channels," in International Symposium Information Theory, Washington, DC, 1 page, Jun. 2001.

Hui Liu et al., "A High-Efficiency Carrier Estimator For OFDM Communications," IEEE Communications Letters, vol. 2, No. 4, pp. 104-106, Apr. 1998.

Hikmet Sari et al., "Transmission Techniques for Digital Terrestial TV Broadcasting," IEEE Communications Magazine, vol. 33, pp. 100-103, Feb. 1995.

H. Vikalo et al., "Optimal Training for Frequency-Selective Fading Channels," Procedures of International Conference on ASSP, Salt Lake City, Utah, vol. 4, pp. 2105-2108, May 7-11, 2001.

I. Barhumi et al., "Optimal Training Sequences for Channel Estimation in MIMO OFDM Systems in Mobile Wireless Communications," Procedures of International Zurich Seminar on Access, Transmission, Networking of Broadband Communications, 6 pgs., ETH Zurich, Switzerland, Feb. 19-21, 2002.

I.Emre Telatar, "Capacity of Multiple-Antenna Gaussian Channels," European Transactions Telecommunications, vol. 10, pp. 1-28, Nov.-Dec. 1998.

Jens Baltersee et al., "Achievable Rate of MIMO Channels With Data-Aided Channel Estimation and Perfect interleaving," IEEE Journal on Selected Areas In Communication, vol. 19, No. 12, 2358-2368, Dec. 2001.

J. Boutros et al., "Signal Space Diversity: A Power And Bandwidth Efficient Diversity Technique for the Rayleigh Fading Channel," IEEE Transactions Information Theory, vol. 44, pp. 1-34, Jul. 1998.

Jerome A. Gansman et al., "Optimum and Suboptimum Frame Synchronization for Pilot-Symbol-Assisted Modulation," IEEE Transactions on Communications, vol. 45, No. 10, pp. 1327-1337, Oct. 1997.

Jiann-Cing Guey et al., "Signal Design for Transmitter Diversity Wireless Communication Systems Over Rayleigh Fading Channels," IEEE Transactions on Communications, vol. 47, No. 4, pp. 527-537, Apr. 1999.

Jonathan H. Manton et al., "Affine Precoders for Reliable Communications," in Procedures International Conference ASSP, vol. 5, Istanbul, Turkey, pp. 2749-2752, Jun. 2000.

James K. Cavers, "Pilot Symbol Assisted Modulation and Differential Detection in Fading and Delay Spread," IEEE Transactions On Communications, vol. 43, No. 7, pp. 2206-2212, Jul. 1995.

James K. Cavers, "An Analysis of Pilot Symbol Assisted Modulation for Rayleigh Fading Channels," IEEE Transactions On Vehicular Technology, vol. 40, No. 4, pp. 686-693, Nov. 1991.

John A.C. Bingham, "Multicarrier Modulation for Data Transmission: An Idea Whose Time Has Come," IEEE Communications Magazine, pp. 5-14, May 1990.

Jitendra K. Tugnait et al., "Second-Order Statistics-Based Blind Equalization of IIR Single-Input Multiple-Output Channels with Common Zeros," IEEE Transactions On Signal Processing, vol. 47, No. 1, pp. 147-157, Jan. 1999.

Linda M. Davis et al., "Joint MAP Equalization and Channel Estimation for Frequency-Selective and Frequency-Flat Fast-Fading Channels," IEEE Transactions On communications, vol. 49, No. 12, pp. 2106-2114, Dec. 2001.

Lizhong Zheng et al., "Communication on the Grassmann Manifold: A Geometric Approach to the Noncoherent Multiple-Antenna Channel," IEEE Transactions On Information Theory, vol. 48, No. 2, pp. 359-383, Feb. 2002.

Min Dong et al., "Optimal Design and Placement of Pilot Symbols for Channel Estimation," IEEE Transactions On Signal Processing, vol. 50, No. 12, pp. 3055-3069, Dec. 2002.

Massimiliano (Max) Martone, "Wavelet-Based Separating Kernels for Sequence Estimation with Unknown Rapidly Time-Varying Channels," IEEE Communications Letter, vol. 3, No. 3, pp. 78-80, Mar. 1999.

Muriel Medard, "The Effect Upon Channel Capacity in Wireless Communications of Perfect and Imperfect Knowledge of the Channel," IEEE Transactions on Information Theory, vol. 46, No. 3, pp. 933-946, May 2000.

Michele Morelli et al., "Carrier-Frequency Estimation for Transmissions Over Selective Channels," IEEE Transactions On Communications, vol. 48, No. 9, pp. 1580-1589, Sep. 2000.

Magnus Sandell et al., "A Comparative Study of Pilot-Based Channel Estimators for Wireless OFDM," pp. 5-34, Sep. 1996.

Martin V. Clark, "Adaptive Frequency-Domain Equalization and Diversity Combining for Broadband Wireless Communications," IEEE Journal on Selected Areas in Communications, vol. 16, No. 8, pp. 1385-1395, Oct. 1998.

Michail K. Tsatsanis et al., "Equalization of Rapidly Fading Channels: Self-Recovering Methods," IEEE Transactions on Communications, vol. 44, No. 5, pp. 619-630, May 1996.

Michail K. Tsatsanis et al., "Modelling and Equalization of Rapidly Fading Channels," International Journal of Adaptive Control and Signal Processing, vol. 10, pp. 159-176, May 1996.

Michail K. Tsatsanis et al., "Pilot Symbol Assisted Modulation in Frequency Selective Fading Wireless Channels," IEEE Transactions On Signal Processing, vol. 48, No. 8, pp. 2353-2365, Aug. 2000.

Naofal Al-Dhahir, "Single-Carrier Frequency-Domain Equalization for Space-Time Block-Coded Transmissions Over Frequency-Selective Fading Channels," IEEE Communications Letters, vol. 5, No. 7, pp. 304-306, Jul. 2001.

Oussama Damen et al., "Lattice Code Decoder for Space-Time Codes," IEEE Communication Letters, vol. 4, No. 5, pp. 161-163, May 2000.

Naofal Al-Dhahir et al., "Block Transmission Over Dispersive Channels: Transmit Filter Optimization and Realization, and MMSE-DFE Receiver Performance," IEEE Transactions Information Theory, vol. 42, No. 1, pp. 137-160, Jan. 1996.

Peter Hoeher et al., "Channel Estimation with Superimposed Pilot Sequence," in Procedure GLOBECOM Conference, Brazil, pp. 1-5, Dec. 1999.

Peter Hoeher et al., "Two-Dimensional Pilot-Symbol-Aided Channel Estimation by Wiener Filtering," Procedures of International Conference on Acoustics, Speech and Signal Processing, Munich, Germany, vol. 3, pp. 1845-1848, Apr. 1997.

Paul H. Moose, "A Technique for Orthogonal Frequency Division Multiplexing Frequency Offset Correction," IEEE Transactions On Communications, vol. 42, No. 10, pp. 2908-1314, Oct. 1994.

Peter Schramm, "Analysis and Optimization of Pilot-Channel-Assisted BPSK for DS-CDMA Systems," IEEE Transactions Communications, vol. 46, No. 9, pp. 1122-1124, Sep. 1998.

Peter Schramm et al., "Pilot Symbol Assisted BPSK on Rayleigh Fading Channels with Diversity: Performance Analysis and Parameter Optimization," IEEE Transactions on Communications, vol. 46, No. 12, pp. 1560-1563, Dec. 1998.

Qinfang Sun et al., "Estimation of Continuous Flat Fading MIMO Channel," IEEE Transactions On Wireless Communications, vol. 1, No. 4, pp. 549-553, Oct. 2002.

Rohit Negi et al., "Pilot Tone Selection for Channel Estimation in a Mobile OFDM System," IEEE Transactions On Consumer Electronics, vol. 44, No. 3, pp. 1122-1128, Aug. 1998.

Robert Molten Gray, "On the Asymptotic Eigenvalue Distribution of Toeplitz Matrices," IEEE Transactions On Information Theory, vol. IT-18, No. 6, pp. 725-730, Nov. 1972.

Srihari Adireddy et al, "Optimal Placement of Training for Frequency-Selective Block-Fading Channels," IEEE Transactions On Information Theory, vol. 48, No. 8, pp. 2338-2353, Aug. 2002.

Srihari Adireddy et al., "Detection With Embedded Known Symbols: Optimal Symbol Placement and Equalization," In Procedures of International Conference ASSP, vol. 5, Istanbul, Turkey, pp. 2541-2544, Jun. 2000.

Stephan Baro et al., "Improved Codes for Space-Time Trellis Coded Modulation," IEEE Communication Letters, vol. 4, pp. 1-3, Jan. 2000.

Sergio Benedetto et al., "Principles of Digital Transmission with Wireless Applications," Kluwer Academic/Plenum Publishers, 1 pg., 1999.

Srikrishna Bhashyam et al., "Time-Selective Signaling and Reception for Communication Over Multipath Fading Channels," IEEE Transactions On Communications, vol. 48, No. 1, pp. 1-34, Jan. 2000.

Stefan A. Fechtel et al., "Optimal Parametric Feedforward Estimation of Frequency-Selective Fading Radio Channels," IEEE Transactions on Communications, vol. 42, No. 2/3/4, pp. 1639-1650, Feb./Mar./Apr. 1994.

S.N. Diggavi et al., "Differential Space-Time Coding for Frequency-Selective Channels," Procedures of $36^{th}$ Conference on Information Sciences and Systems, pp. 1-8, Princeton University, NJ, Mar. 20-22, 2002.

Shuichi Ohno et al., "Average-Rate Optimal PSAM Transmissions Over Time-Selective Fading Channels," IEEE Transactions On Wireless Communications, pp. 374-378, Oct. 2002.

Shuichi Ohno et al., "Capacity Maximizing MMSE-Optimal Pilots for Wireless OFDM Over Frequency-Selective Block Rayleigh-Fading Channels," IEEE Transactions On Information Theory, pp. 2138-2145, vol. 50, No. 9, Sep. 2004.

Shuichi Ohno et al., "Optimal Training and Redundant Precoding For Block Transmissions With Application to Wireless OFDM," IEEE Transactions on Communications, vol. 50, No. 12, pp. 2113-2123, Dec. 2002.

Shengli Zhou et al., "Space-Time Coding With Maximum Diversity Gains Over Frequency-Selective Fading Channels," IEEE Signal Processing Letters, vol. 8, No. 10, pp. 269-272, Oct. 2001.

Shengli Zhou et al., "Subspace-Based (Semi-) Blind Channel Estimation for Block Precoded Space-Time OFDM," IEEE Transactions On Signal Processing, vol. 50, No. 5, pp. 1215-1228, May 2002.

Siavash M. Alamouti, "A Simple Transmit Diversity Technique For Wireless Communications," IEEE Journal on Select Areas In Communications, vol. 16, No. 8, pp. 1451-1458, Oct. 1998.

Thomas Kailath, "Measurements on Time-Variant Communication Channels," IEEE Transactions On Information Theory, vol. IT-8, pp. S229-S236, Sep. 1962.

Thomas Keller et al., "Adaptive Multicarrier Modulation: A Convenient Framework for Time-Frequency Processing in Wireless Communications," IEEE Procedings of the IEEE, vol. 88, No. 5, pp. 611-640, May 2000.

Thomas L. Marzetta and Bertrand M. Hochwald, "Capacity of a Mobile Multiple-Antenna Communication Link in Rayleigh Flat Fading," IEEE Transactions on Information Theory, vol. 45, pp. 1-38, Jan. 1999.

Tai-Lai Tung et al., "Channel Estimation and Adaptive Power Allocation for Performance and Capacity Improvement of Multiple-Antenna OFDM Systems," Third IEEE Signal Processing Workshop on Signal Processing Advances in Wireless Communications, Taoyuan, Taiwan, pp. 82-85, Mar. 20-23, 2001.

Thomas P. Holden et al., "A Spread-Spectrum Based Synchronization Technique for Digital Broadcast Systems," IEEE Transactions on Broadcasting, vol. 36, No. 3, pp. 185-194, Sep. 1990.

Ufuk Tureli et al., "OFDM Blind Carrier Offset Estimation: ESPRIT," IEEE Transactions On Communications, vol. 48, No. 9, pp. 1459-1461, Sep. 2000.

Vahid Tarokh et al., "Space-Time Block Codes from Orthogonal Designs," IEEE Transactions on Information Theory, vol. 45, No. 5, pp. 1456-1467, Jul. 1999.

Vahid Tarokh et al., "Space-Time Codes for High Data Rate Wireless Communication: Performance Criterion and Code Construction," IEEE Transactions on Information Theory, vol. 44, No. 2, pp. 744-765, Mar. 1998.

Werner Kozek, "On the Transfer Function Calculus for Underspread LTV Channels," IEEE Transactions On Signal Processing, vol. 45, No. 1, pp. 219-223, Jan. 1997.

Wen-Yi Kuo et al., "Frequency Offset Compensation of Pilot Symbol Assisted Modulation in Frequency Flat Fading," IEEE Transactions on Communications, vol. 45, No. 11, pp. 1412-1416, Nov. 1997.

Won-Joon Choi et al., "Multiple Input/Multiple Output (MIMO) Equalization for Space-Time Block Coding," IEEE Pacific Rim Conference on Communications, Computers and Signal Processing, pp. 341-344, 1999.

Won-Joon Choi et al., "Space-Time Block Codes Over Frequency Selective Rayleigh Fading Channels," IEEE VTC, vol. 5, pp. 2541-2545, 1999.

Xavier Giraud et al., "Algebraic Tools To Build Modulation Schemes for Fading Channels," IEEE Transactions on Information Theory, vol. 43, No. 3, pp. 938-952, May 1997.

Xiaodong Wang et al., "Iterative (Turbo) Soft Interference Cancellation and Decoding for Coded CDMA," IEEE Transactions on Communications, vol. 47, No. 7, pp. 1046-1061, Jul. 1999.

Xiaoli Ma et al., "Maximum Diversity Transmissions Over Doubly Selective Wireless Channels," IEEE Transactions On Information Theory, vol. 49, No. 7, pp. 1832-1840, Jul. 2003.

Xiaoli Ma et al., "Optimal Training for Block Transmissions Over Doubly Selective Wireless Fading Channels," IEEE Transactions on Signal Processing, vol. 51, No. 5, pp. 1351-1366, May 2003.

Xiaoli Ma et al., "Non-Data-Aided Carrier Offset Estimators for OFDM With Null Subcarriers: Identifiability, Algorithms, and Performance," IEEE Journal On Selected Areas In Communications, vol. 19, No. 12, pp. 2504-2515, Dec. 2001.

Xiaoli Ma et al., "Optimal Training for MIMO Frequency-Selective Fading Channels," IEEE Transactions on Wireless Communications, pp. 1-14.

Ye (Geoffrey) Li et al., "Transmitter Diversity for OFDM Systems and Its Impact on High-Rate Data Wireless Networks," IEEE Journal on Selected Areas In Communications, vol. 17, No. 7, pp. 1233-1243, Jul. 1999.

Ye (Geoffrey) Li, "Simplified Channel Estimation for OFDM Systems With Multiple Transmit Antennas," IEEE Transactions On Wireless Communications, vol. 1, No. 1, pp. 67-75, Jan. 2002.

Ye (Geoffrey) Li, Nambirajan Seshadri, and Sirikiat Ariyavisitakul, "Channel Estimation for OFDM Systems with Transmitter Diversity in Mobile Wireless Channels," IEEE Journal on Selected Areas in Communications, vol. 17, No. 3, pp. 461-471, Mar. 1999.

Youjian Liu et al., "Space-Time Codes Performance Criteria and Design for Frequency Selective Fading Channels," Procedures of International Conference on Communication, pp. 1-5.

Yuan-Pei Lin et al., "Block Based DMT Systems With Reduced Redundancy," Procedures of International Conference on ASSP, Salt Lake City, UT, pp. 2357-2360, May 2001.

Yan Xin et al., "Linear Unitary Precoders for Maximum Diversity Gains with Multiple Transmit and Receive Antennas," Procedure of $34^{th}$ Asilomar Conference on Signals, Systems, and Computers, pp. 1553-1557, Pacific Grove, CA, Oct. 29-Nov. 1, 2000.

Yuze Zhang et al., "A Performance Analysis and Design of Equalization with Pilot Aided Channel Estimation," Procedures of the $47^{th}$ Vehicular Technology Conference, vol. 2, pp. 720-724, 1997.

Yuze Zhang et al., "Soft Output Demodulation on Frequency-Selective Rayleigh Fading Channels Using AR Channel Models," Procedures of Global Communications Conference, vol. 1, pp. 327-331, 1997.

Zhiqiang Liu et al., "Space-Time Block-Coded Multiple Access Through Frequency-Selective Fading Channels," IEEE Transactions on Communications, vol. 49, No. 6, pp. 1033-1044, Jun. 2001.

Zhiqiang Liu, et al., "Space-Time Coding for Broadband Wireless Communications," Wireless Communication Mobile Computers, vol. 1, No. 1, pp. 33-53, Jan.-Mar. 2001.

Zhiqiang Liu et al., "Transmit-Antennae Space-Time Block Coding for Generalized OFDM in the Presence of Unknown Multipath," IEEE Journal on Selected Areas In Communications, vol. 19, No. 7, pp. 1352-1364, Jul. 2001.

Zhiqiang Liu et al., "Linear Constellation Precoding for OFDM with Maximum Multipath Diversity and Coding Gains," IEEE Transactions On Communications, vol. 51, No. 3, pp. 416-427, Mar. 2003.

Zhiqiang Liu et al., Space-Time-Frequency Coded OFDM Over Frequency-Selective Fading Channels, IEEE Transactions on Signal Processing, vol. 50, No. 10, pp. 2465-2476, Oct. 2002.

Zhiqiang Liu et al., "Space-Time Coding With Transmit Antennas for Multiple Access Regardless of Frequency-Selective Multipath," Procedures of Sensor Arry and Multichannel Signal Processing Workshop, pp. 178-182, Mar. 2000.

Zhengdao Wang et al., "Wireless Multicarrier Communications: Where Fourier Meets Shannon," IEEE Signal Processing Magazine, vol. 17, pp. 29-48, May 2000.

Zhengdao Wang et al., "Linearly Precoded or Coded OFDM Against Wireless Channel Fades?," Third IEEE Signal Processing Workshop on Signal Processing Advances in Wireless Communications, Taoyuan, Taiwan, pp. 1-4, Mar. 20-23, 2001.

Zhengdao Wang et al., "Optimality of Single-Carrier Zero-Padded Block Transmissions," Procedures of Wireless Communications and Networking Conference, vol. 2, pp. 660-664, 2002.

Caire et al., "Bit-Interleaved Coded Modulation," IEEE Transactions on Information Theory, vol. 44, No. 3, pp. 927-946, May 1998.

Courville et al., "Blind Equalization of OFDM Systems based on the Minimization of a Quadratic Criterion," Proc. of ICC, Dallas, USA, vol. 3, pp. 1318-1321, Jun. 1996.

Frenger et al., "Decision-Directed Coherent Detection in Multicarrier Systems on Rayleigh Fading Channels," IEEE Trans. On Vehicular Tech., vol. 48, No. 2, pp. 490-498, Mar. 1999.

Heath, Jr. et al., "Exploiting Input Cyclostationarity for Blind Channel Identification in OFDM Systems," IEEE Transactions on Signal Processing, vol. 47, No. 3, pp. 848-856, Mar. 1999.

Mignone et al., "CD3-0FDM: A Novel Demodulation Scheme for Fixed and Mobile Receivers," IEEE Transactions on Communications, vol. 44, No. 9, pp. 1144-1151, Sep. 1996.

Muquet et al., "A Subspace Based Blind and Semi-Blind Channel Identification Method for OFDM Systems," Proc. of IEEE-SP Workshop on Signal Proc. Advances in Wireless Comm., Annapolis, MD, pp. 170-173, May 9-12, 1999.

Muquet et al., "OFDM with Trailing Zeros Versus OFDM with Cyclic Prefix: Links, Comparisons and Application to the Hiperlan/2 Systems," Proc. of Intl. Conf. On Com., New Orleans, pp. 1049-1053, Jun. 2000.

Ruiz et al., "Discrete Multiple Tone Modulation with Coset Coding for the Spectrally Shaped Channel," IEEE Transactions on Communications, vol. 4, No. 6, pp. 1012-1029, Jun. 1992.

Tufvesson et al. "Pilot Assisted Channel Estimation for OFDM in Mobile Cellular Systems," Proc. of the Vehicular Technology Conf., Phoenix, USA, vol. 3, pp. 1639-1643, May 1997.

van de Beek et al., "On Channel Estimation in OFDM Systems," Proc. of the Vehicular Technology Conf., Chicago, USA, vol. 2, pp. 815-819, Jul. 1995.

van Nee et al., "New High-Rate Wireless LAN Standards," IEEE Communications Magazine, vol. 37, No. 12, pp. 82-88, Dec. 1999.

Zhou et al., "Long Codes for Generalized FH-OFDMA Through Unknown Multipath Channels," IEEE Transactions on Communications, vol. 49, No. 4, pp. 721-733, Feb. 2001.

Zhou et al., "Frequency-Hopped Generalized MC-CDMA for Multipath and Interference Suppression," Proc. Of MILCOM Conf., Los Angeles, CA, pp. 937-941, Oct. 22-25, 2000.

Giannakis et al., "Basis Expansion Models and Diversity Techniques for Blind Identification and Equalization of Time-Varying Channels," Proceedings of the IEEE, vol. 86, No. 10, Oct. 1998.

Ohno et al., "Capacity Maximizing MMSE-Optimal Pilots for Wireless OFDM Over Frequency—Selective Block Rayleigh-Fading Channels," IEEE Transactions on Information Theory, vol. 50, No. 9, Sep. 2004.

* cited by examiner

CHANNEL ESTIMATION FOR BLOCK TRANSMISSIONS OVER TIME- AND FREQUENCY-SELECTIVE WIRELESS FADING CHANNELS

This application claims priority from U.S. Provisional Application Ser. No. 60/472,290, filed May 21, 2003, the entire content of which is incorporated herein by reference.

STATEMENT REGARDING FEDERALLY SPONSORED RESEARCH OR DEVELOPMENT

This invention was made with Government support under Agent Grant No. 01-05612 awarded by the National Science Foundation and with Government support under Agency Grant No. DAAD19-01-2-011 awarded by the Army Research Lab (ARL/CTA). The Government may have certain rights in the invention.

TECHNICAL FIELD

The invention relates to wireless communication systems and, more particularly, transmitters and receivers for use in wireless communications.

BACKGROUND

Providing reliable high data rate services, e.g. real-time multimedia services, over wireless and mobile communication channels is a paramount goal in developing coding and modulation schemes. When a data rate for wireless and mobile communication channels is high in relation to bandwidth, multipath propagation causes frequency-selective propagation while carrier frequency offsets and mobility induced Doppler shifts cause time-selectivity. Time- and frequency-selective propagation effects cause performance degradation and constitute the bottleneck for increasing data rates.

In order to mitigate time- and frequency-selective propagation effects, channel state information (CSI) is collected at the receiver. CSI is acquired at a receiver either by relying on training symbols that are known a priori by the receiver or by relying only on the received information-bearing symbols to acquire CSI blindly. Relative to channel estimation schemes relying on training symbols, blind channel estimation schemes typically require longer sequences of symbols and entail higher complexity. Adaptive or decision directed methods for channel estimation offer reduced complexity alternatives but are prone to error propagation and are limited to slowly varying channels. Consequently, training-based channel estimation schemes remain attractive despite being suboptimal and bandwidth consuming because training-based schemes decouple symbol detection from channel estimation, thereby reducing complexity and relaxing the required identifiability conditions.

SUMMARY

In general, the invention is directed to techniques for channel estimation of wireless block transmissions over communication channels, which may be both time- and frequency selective fading communication channels. In particular, techniques are described for forming blocks of symbols that utilize blocks of training symbols such that channel estimation is decoupled from symbol detection at the receiver. The structure and coding scheme of the blocks of symbols transmitted over the communication channel are designed and, in one embodiment, minimizes the minimum mean-square error (MMSE) and maximizes the average capacity of the communication channel.

In one embodiment, the invention is directed to a method comprising forming a block of symbols that includes at least two blocks of training symbols separated by at least one information-bearing symbol, wherein each block of training symbols has two or more training symbols; and outputting a wireless transmission signal in accordance with the block of symbols over a wireless communication channel.

In another embodiment, the invention is directed to a method comprising receiving a wireless signal transmitted from a block of symbols over a wireless communication channel, wherein the block of symbols comprises at least two blocks of training symbols of two or more training symbols, the blocks of training symbols separated by at least one information-bearing symbol; and estimating the wireless communication channel based on the blocks of training symbols within the received signal; and outputting estimated symbols based on the estimate of the wireless communication channel.

In another embodiment, the invention is directed to a wireless communication device comprising a block forming unit to form a block of symbols that includes at least two blocks of training symbols separated by at least one information-bearing symbol, wherein each block of training symbols has two or more training symbols; and a pulse shaping unit to output a wireless transmission signal in accordance with the block of symbols over a wireless communication channel.

In yet another embodiment, the invention is directed to a wireless communication device comprising one or more antennas that receive a wireless signal transmitted from a block of symbols over a wireless communication channel, wherein the block of symbols comprises at least two blocks of training symbols of two or more training symbols, the blocks of training symbols separated by at least one information-bearing symbols; a channel estimation unit to estimate the wireless communication channel based on the blocks of training symbols within the received signal; and a symbol detection unit to output estimated symbols based on the estimate of the wireless communication channel.

In another embodiment, the invention is directed to a computer-readable medium containing instructions. The instructions cause a programmable processor to form a block of symbols that includes at least two blocks of training symbols separated by at least one information-bearing symbol, wherein each block of training symbols has two or more training symbols; and output a wireless transmission signal in accordance with the block of symbols over a wireless communication The described techniques may offer one or more advantages. For example, the described techniques for selecting the number of training symbols, power of training symbols, and/or power allocation between the training symbols and information-bearing symbols within the blocks of symbols may allow for optimization of a tradeoff between channel estimation and average channel capacity. Furthermore, because the techniques decouple channel estimation from symbol detection at the receiver, low-complexity channel estimation can be performed.

The details of one or more embodiments of the invention are set forth in the accompanying drawings and the description below. Other features, objects, and advantages of the invention will be apparent from the description and drawings, and from the claims.

DETAILED DESCRIPTION

Throughout the Detailed Description bold upper letters denote matrices, bold lower letters stand for column vectors, $(\cdot)^T$ and $(\cdot)^H$ denote transpose and Hermitian transpose, respectively; $(\cdot)^*$ denotes conjugate and $(\cdot)^\dagger$ denotes the matrix pseudoinverse. E[·] stands for expectation with respect to all the random variables with the brackets, $\lceil \cdot \rceil$ and $\lfloor \cdot \rfloor$ represent the integer floor and integer ceiling, respectively; * and † represent convolution and Kroenecker's product, respectively; $[A]_{k,m}$ denotes the (k, m)th entry of a matrix A, tr(A) represents the trace of matrix A, and $[x]_m$ denotes the mth entry of the column vector x, and diag[x] stands for a diagonal matrix with x on its main diagonal.

Figure 1:
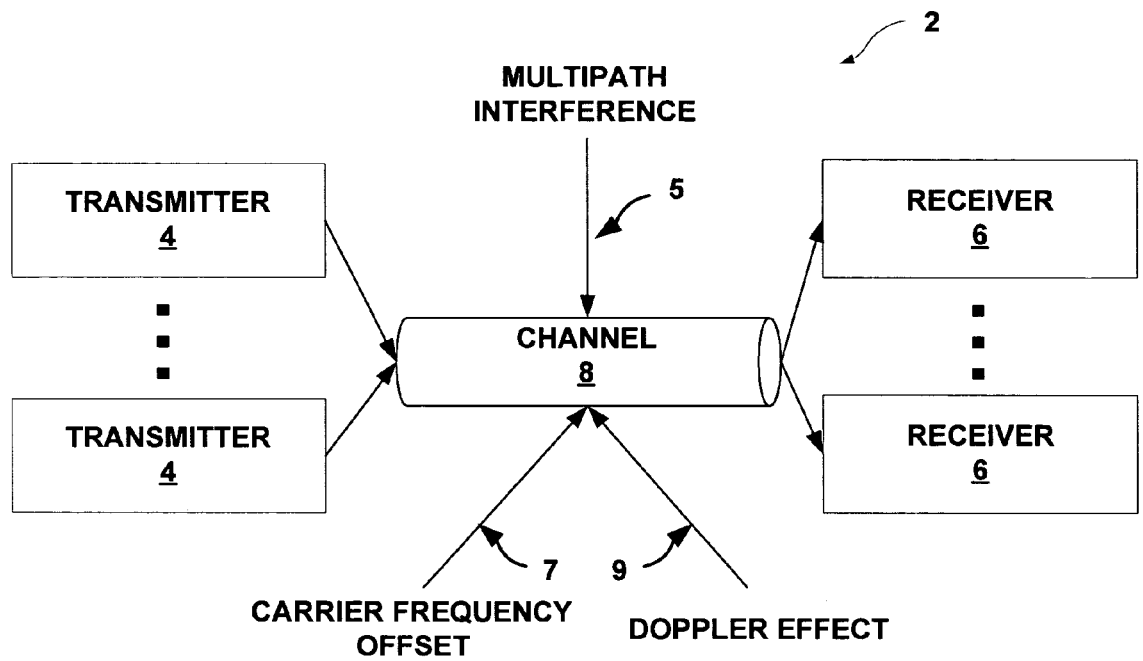
FIG. 1 is a block diagram illustrating an exemplary wireless multi-user communication system in which multiple transmitters communicate with multiple receivers through a wireless communication channel.

FIG. 1 is a block diagram illustrating a multi-user wireless communication system 2 in which multiple transmitters communicate with multiple receivers through time- and frequency-selective wireless communication channel 8. In general, the invention provides techniques for forming estimates of channel 8 at receivers 6. In particular, training symbols are utilized in a manner that suppresses any effects of multi-path interference 5, carrier frequency offsets 7, and/or Doppler effects 9 that could otherwise be introduced during transmission through time- and frequency-selective channel 8. Furthermore, the structure and coding scheme of the blocks of symbols transmitted by transmitters 4 are designed so that in one embodiment, the minimum mean-square error (MMSE) of channel 8 is minimized and the average capacity is maximized.

In general, wireless communication channel 8 may experience frequency-selectivity when high data rates in relation to bandwidth create multipath interference 5 while carrier frequency offsets 7 and the Doppler effect 9 may cause frequency-selectivity. Carrier frequency offsets 7 can occur when a voltage controlled oscillator (VCO) of a receiver 6 is not oscillating at exactly the same carrier frequency as a VCO of a transmitter 4, while the Doppler effect 9 is typically caused by varying distances between a transmitter 4 and a receiver 6.

To suppress these effects, each of transmitters 4 outputs a wireless transmission signal in accordance with a block of symbols in which at least two blocks of training symbols of two or more training symbols are separated by at least one information-bearing symbol. In particular, the blocks of training symbols are designed to be separable from the information-bearing symbols at each of receivers 6 so that channel estimation is decoupled from symbol detection at each of receivers 6, thereby enabling the receivers to perform low-complexity channel estimation. Each of receivers 6 receive the wireless transmission signal and estimate time- and frequency-selective channel 8 based on the received blocks of training symbols. Symbol estimates are output based on the received information-bearing symbols and channel estimates.

The described techniques can work with existing block transmission formats and, therefore, is backward compatible with a number of conventional multi-user transmission formats including Code Division Multiple Access (CDMA) and Orthogonal Frequency Division Multiplexing (OFDM). The former is an example of single-carrier multiple access scheme, while the latter is a multi-carrier scheme. OFDM has been adopted by many standards including digital audio and video broadcasting (DAB, DVB) in Europe and high-speed digital subscriber lines (DSL) in the United States. OFDM has also been proposed for local area mobile wireless broadband standards including IEEE802.11a, MMAC and HIPERLAN/2.

The techniques described herein apply to uplink and downlink transmissions, i.e., transmissions from a base station to a mobile device and vice versa. Transmitters 4 and receivers 6 may be any device configured to communicate using a multi-user block wireless transmissions including a cellular distribution station, a hub for a wireless local area network, a cellular phone, a laptop or handheld computing device, a personal digital assistant (PDA), a Bluetooth™ enabled device and other such devices.

Figure 2:
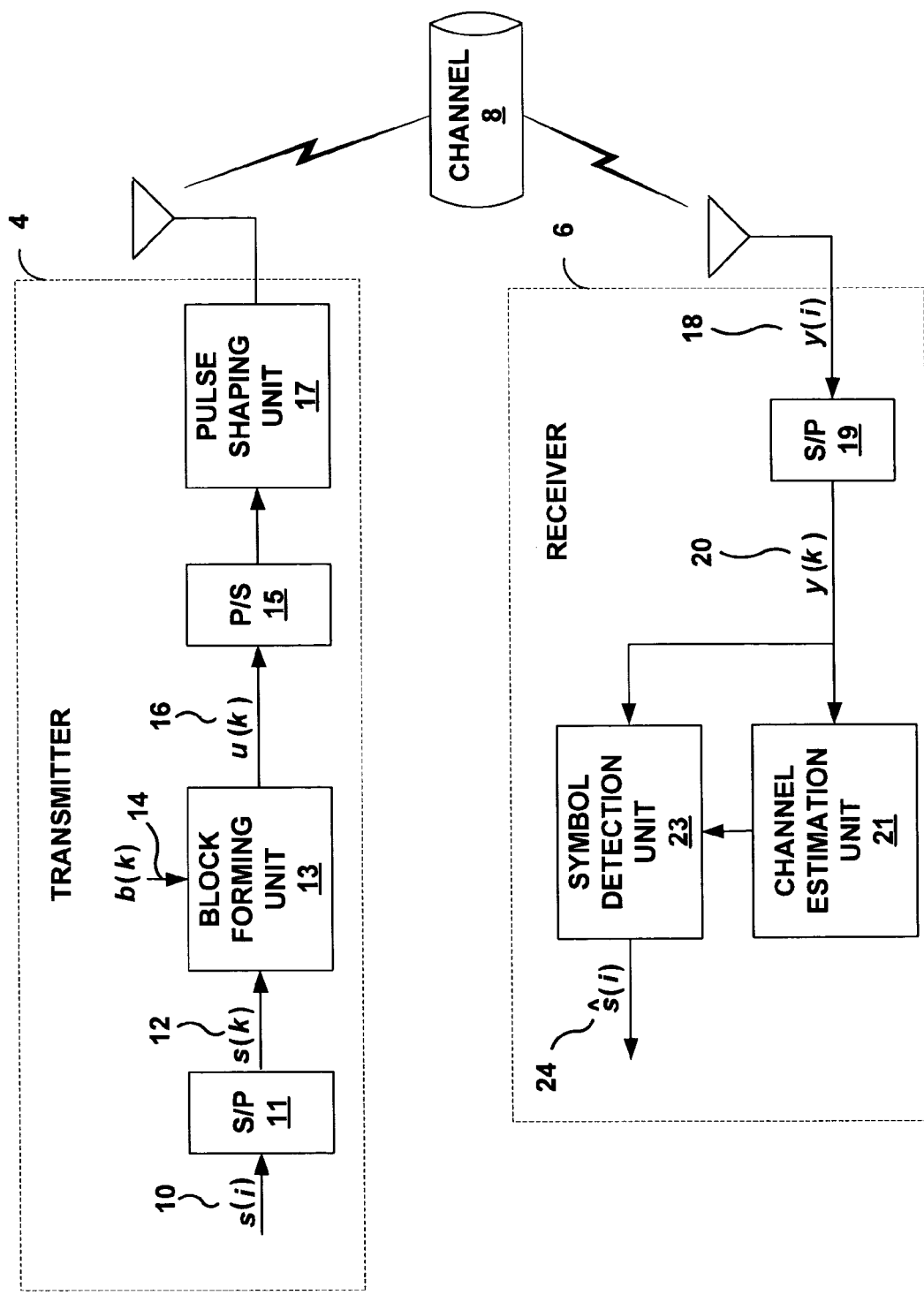
FIG. 2 is a block diagram illustrating in further detail one embodiment of a transmitter and a receiver within the multi-user communication system of FIG. 1.

FIG. 2 is a block diagram illustrating in further detail one embodiment of a transmitter 4 and a receiver 6 within the multi-user communication system 2 of FIG. 1. In particular, FIG. 2 illustrates exemplary embodiments of transmitter 4 and receiver 6 communicating over time- and frequency-selective, also referred to as "doubly-selective", wireless communication channel 8.

Generally, receiver 6 corresponds to a particular user, and performs channel estimation of a wireless transmission signal output by transmitter 4 over doubly-selective channel 8. In particular, receiver 6 performs channel estimation in accordance with blocks of symbols formed by transmitter 4 by the insertion of one or more blocks of training symbols within each block of information-bearing symbols. More specifically, each information-bearing symbol s(i) 10 is of a serial stream of information-bearing symbols is input into serial to parallel converter 11 which parses $N_s$ information-bearing symbols into blocks of information-bearing symbols s(k) 12. Two arguments, n and k, are used herein to described the serial index i=kN+n for n∈[0, N−1] and the (n+1)st entry of the kth block is denoted as $[s(k)]_n := s(kN+n)$. Consequently, each block of information-bearing symbols $s(k) := [s(kN_s), \ldots, s(kN_s+N_s-1)]^T$ 12 includes $N_s$ information-bearing symbols. Block forming unit 13 forms a block of symbols u(k) 16 by inserting a block of training symbols $b(k) := [b(kN_b), \ldots, b(kN_b+N_b-1)]^T$ 14 into blocks of information bearing symbols 10, as will be described in greater detail below Each block of training symbols b(k) 14 includes $N_b$ training symbols which are known to transmitter 4. Consequently, each block of symbols u(k) [u(kN), . . . , u(kN+N−1)]$^T$ 16 includes N=$N_s$+$N_b$ symbols. Parallel to serial converter (P/S) 15 parses the blocks of symbols 16 into a serial stream of symbols from which pulse shaping unit 17 forms a wireless transmission signal for transmission through doubly-selective channel 8.

Generally, the time-varying impulse response of channel that includes transmit-receive filters as well as doubly-selective propagation effects, multipath interference 5, carrier frequency offset 7, and the Doppler effect 9, can be represented by h(t; τ). With H(f; τ) representing the Fourier Transform of h(t; τ), the delay-spread is denoted as $\tau_{max}$ and the Doppler-spread is represented as $f_{max}$. The delay-spread and Doppler-spread are defined as the thresholds for which |H(f; τ)|≈0, for |τ|>$\tau_{max}$ or, |f|>$f_{max}$. The sampling period at receiver 6 is equal to the symbol period $T_s$ and the blocks of symbols 16 are transmitted over channel 8 during time intervals of $NT_s$ seconds. Over each time interval of $NT_s$ seconds, for example the kth, we represent h(t; τ) for t∈[$kNT_s$, (k+1)$NT_s$] using: a) Q+1 coefficients $\{h_q\}_{q=0}^Q$ that remain invariant per block, but are allowed to change with k, i.e. the coefficients are invariant during transmission of a block of symbols, but are allowed to change from block to block, and b) Q+1 Fourier bases that capture the time variation, but are common for all k. Using the serial index i, the block index can be defined k:=⌊i/N⌋. As a result, the discrete-time baseband equivalent model of channel 8 can be represented according to equation (1) where $\omega_q := 2\pi(q-Q/2)/N$, L:=⌊$\tau_{max}/T_s$⌋, and Q:=2⌈$f_{max}NT_s$⌉.

$$h(i; l) = \sum_{q=0}^{Q} h_q(\lfloor i/N \rfloor; l) e^{j\omega_q i}, l \in [0, L] \quad (1)$$

Because both $\tau_{max}$ and $f_{max}$ can be measured experimentally, it is assumed that $\tau_{max}$, $f_{max}$, and thus L and Q, are bounded, known, and satisfy 2 $f_{max}\tau_{max}$<1 (Assumption 1).

The product 2 $f_{max}\tau_{max}$ is known as the delay-Doppler spread factor and plays an important role in estimating double-selective channels. Underspread systems satisfy 2 $f_{max}\tau_{max}$<1, which can be viewed as bounding the channel's degrees of freedom and renders estimation well-posed. For example, most ionospheric- and tropospheric-scattering channels as well as other radio channels give rise to underspread channels.

Per block of N symbols, the basis expansion model (BEM) of equation (1) can be viewed either as deterministic or, as the realization of a stochastic process with random coefficients $h_q(\lfloor i/N \rfloor; l)$. When transmissions experience rich scattering and no line-of-sight is present, the central limit theorem can be applied to validate the following assumption when the BEM is viewed as a stochastic process with random coefficients. It is assumed that the BEM coefficients $h_q(\lfloor i/N \rfloor; l)$ are zero mean, complex Gaussian random variables with variance $\sigma_{q,l}^2$ (Assumption 2).

The BEM offers a parsimonious finite-parameter representation of doubly-selective channels and was originally introduced in G. B. Giannakis and C. Tepedelenlioğlu, "Basis Expansion Models and Diversity Techniques for Blind Identification and Equalization of Time-Varying Channels" Proceedings of the IEEE, pp. 1969-1986, November, 1998, M. K. Tsatasanis and G. B. Giannakis, "Equalization of Rapidly Fading Channels: Self-Recovering Methods," IEEE Transactions on Communications, vol. 44, no. 5, pp. 619-630, May 1996, and M. K. Tsatsanis and G. B. Giannakis, "Modeling and Equalization of Rapidly Fading Channels," International Journal of Adaptive Control and Signal Processing, vol. 10, pp. 159-176, May 1996.

Therefore, the ith received sample y(i) 18 can be written according to equation (2) where w(i) is additive white Gaussian noise (AWGN) with mean zero and variance $\sigma_w^2$.

$$y(i) = \sum_{l=0}^{L} h(i; l) u(i-l) + w(i) \quad (2)$$

Serial to parallel converter 19 converts a serial stream of y(i)s 18 into N×1 blocks y(k):=[y(kN), y(kN+1), . . . , y(kN+N−1)]$^T$ 20. Selecting N≧L the matrix-vector counterpart of equation (2) can be written according to equation (3) where w(k):=[w(kN), w(kN+1), . . . , w(kN+N−1)]$^T$, while H(k) and H$^{ibi}$(k) are N×N upper and lower triangular matrices with entries [H(k)]$_{n,m}$=h(kN+n; n−m), and [H$^{ibi}$(k)]$_{n,m}$=h(kN+n; N+n−m) for n, m=1, . . . , N.

$$y(k)=H(k)u(k)+H^{ibi}(k)u(k-1)+w(k) \quad (3)$$

The second term on the right hand side (r.h.s) of equation (3) captures the interblock interference (IBI) that emerges due to the channel delay-spread. It is important to note that all the channel taps are time-dependent and H(k) as well as H$^{ibi}$(k) are not Toeplitz matrices.

Because the channel estimation coefficients $h_q(\lfloor i/N \rfloor; l)$ in equation (1) are time invariant over $NT_s$ seconds, channel estimation unit 21 performs channel estimation every N symbols. In other words, channel estimation unit 21 performs channel estimation on a block-by-block basis. In order to enable low-complexity block-by-block processing, the IBI is removed across received blocks, but also within each received block. IBI can be removed by introducing redundancy at transmitter 4 by inserting a cyclic prefix and then discarding the "channel-contaminated" redundant symbols at receiver 6, or by inserting guard zeros per transmitted block. The latter is adopted in transmitter 4 and each block u(k) 16 satisfies condition 1.

Condition 1 Each block of symbols u(k) 16 has the form [$\bar{u}^T(k)$ $0_{1\times L}$]$^T$ where the (N−L)×1 vector $\bar{u}(k)$ contains $N_s$ information-bearing symbols and $N_b$−L≧0 training symbols.

The L trailing zeros in u(k) are viewed as part of the block of training symbols b(k) 14. Because H$^{ibi}$(k)u(k−1)=0, the design of u(k) substantially eliminates IBI. Block forming unit 13 forms blocks of symbols u(k) 16 according to equation (4) so that a block of training symbols b(k) 14 is inserted adjacent to each block of information-bearing symbols s(k) 12. The operation of block forming unit 13 is described in greater detail in FIG. 3.

$$u(k)=[s_1^T(k), b_1^T(k), \ldots, s_P^T(k), b_P^T(k)]^T, \forall k \quad (4)$$

In accordance with equation (4), block forming unit 13 groups consecutive information-bearing symbols and training symbols in sub-blocks $s_p(k)$ and $b_p(k)$ with lengths $N_{s,p}$ and $N_{b,p}$, respectively. Note that these parameters satisfy $\sum_{p=1}^{P} N_{s,p} = N_s$, $\sum_{p=1}^{P} N_{b,p} = N_b$, and $N_s + N_b = N$.

Because blocks of training symbols 14 have $N_b$≧L and the last L entries are zeros, the input-output relationship of equation (3) can be rewritten according to equation (5).

$$y(k)=H(k)u(k)+w(k) \quad (5)$$

Channel estimation unit 21 forms an estimate of H(k), Ĥ(k), based on y(k) 20 and the blocks of training symbols 14 in the transmitted signal. Symbol detection unit 23 outputs estimates ŝ(i) 24 of the recovered information-bearing symbols based on the channel estimate Ĥ(k). Channel estimation is decoupled from symbol detection at receiver 6 because of the separable structure of u(k) in equation (4). Equation (4) also enables separation of each received block y(k) 20 into two different types of received sub-blocks, $y_b(k)$ and $y_s(k)$. $y_b(k)$ depends only on H(k) and $\{b_p(k)\}_{p=1}^P$ whereas $y_s(k)$ depends on H(k), $\{s_p(k)\}_{p=1}^P$, and $\{b_p(k)\}_{p=1}^P$. The block index k is omitted for brevity in the following analysis for channel estimation and symbol detection because the analysis is based on a single block. Consequently, the input-output relationship of equation (5) is rewritten according to equation (6) where $D_q := \text{diag}[1, e^{j\omega_q}, \ldots, e^{j\omega_q(N-1)}]$, and $H_q$ is a lower triangular Toeplitz matrix with first column $[h_q(0), \ldots, h_q(L), 0, \ldots, 0]^T$.

$$y = Hu + w, \text{ with } H := \sum_{q=0}^{Q} D_q H_q, \tag{6}$$

Corresponding to the separation of y to $y_s$ and $y_b$, the channel matrix H can be split into three matrices, $H_s$, $H_b$, and $\overline{H}_b$. Each of the three matrices is constructed from sub-blocks of H and illustrated in detail in FIG. 5. As a result of the separation of y, two input-output relationships are given in equations (7) and (8) for $y_s$ and $y_b$ respectively, where $s := [s_1^T, \ldots, s_P^T]^T$, $b := [b_1^T, \ldots, b_P^T]^T$, $\overline{b}$ includes the first L and last L entries of $b_p$ for all p, while $w_s$ and $w_b$ represent the corresponding noise vectors.

$$y_s = H_s s + \overline{H}_b \overline{b} + w_s \tag{7}$$

$$y_b = H_b b + w_b, \tag{8}$$

The term $\overline{H}_b \overline{b}$ captures the interference of the blocks of training symbols to their respective adjacent blocks of information-bearing symbols.

In order to perform channel estimation we start from the input-output relationship of a block of training symbols given in equation (8). Based on equation (6) and the structure of $H_s$, $H_b$, $\overline{H}_b$, $y_b$ can be written according to equation (9) where $y_p^b := H_p^b b_p + w_p^b$, $\forall p \in [1, P]$, with $H_p^b$ given below, and $n_p$ is the index of the first element of $y_p$ in y, and $w_b = [(w_1^b)^T, \ldots, (w_P^b)^T]^T$ is the corresponding noise block.

$$y_b = \begin{bmatrix} y_1^b \\ \vdots \\ y_P^b \end{bmatrix} = \begin{bmatrix} H_{q,1}^b b_1 \\ \vdots \\ H_{q,P}^b b_P \end{bmatrix} + w_b, \tag{9}$$

Consequently, when $N_{b,p} \leq L$, the matrix $H_p^b$ disappears and $b_p$ does not contain sufficient training symbols for channel estimation. Therefore, the following condition is needed.

Condition 2 The length of each block of training symbols $b_p$ is at least L+1; i.e. $N_{b,p} \geq L+1$, $\forall p \in [1, P]$.

Observing the dimensionality of $H_p^b$, it can be deduced that out of the $N_b$ training symbols transmitted, $N_b$–PL training symbol-dependent observations without interference from the unknown information-bearing symbols are received. Because (Q+1)(L+1) unknown coefficients, to guarantee uniqueness in estimating the channel using linear equations, the total number of training symbols is given in equation (10).

$$N_b \geq PL + (Q+1)(L+1) \tag{10}$$

Therefore, the minimum number of training symbols $N_b$ for estimating doubly-selective channel 8 is L+(Q+1)(L+1) when P=1. Selecting P=1 corresponds to preamble-based training. From a bandwidth efficiency point of view, this method is desirable. However, preamble-based training is not optimal when considering mutual information based on estimated channels. The following analysis examines this tradeoff.

Using equation (9) which is based on equation (1), we can write $H_p^b := \sum_{q=0}^{Q} D_{q,p}^b H_{q,p}^b$ where $H_{q,p}^b$ and $D_{q,p}^b$ are corresponding sub-matrices from $D_q$ and $H_q$ in equation (6). Substituting $H_p^b$ into equation (9) we obtain equation (11).

$$y_b = \sum_{q=0}^{Q} \begin{bmatrix} D_{q,1}^b H_{q,1}^b b_1 \\ \vdots \\ D_{q,P}^b H_{q,P}^b b_P \end{bmatrix} + w_b \tag{11}$$

Due to the commutativity between a Toeplitz, i.e. convolution, matrix product with a vector, $H_{q,p}^b b_p = B_p h_q$, where $B_p$ is an $(N_{b,p}-L) \times (L+1)$ Toeplitz matrix given by equation (12) with $b_{p,n}$ denoting the (n+1)st entry of $b_p$, $h_q$ is given by equation (13), and $H_p^b$ is given by equation (14).

$$B_p = \begin{bmatrix} b_{p,L} & \cdots & b_{p,0} \\ \vdots & \cdots & \vdots \\ b_{p,N_{b,p}-1} & \cdots & b_{p,N_{b,p}-L-1} \end{bmatrix} \tag{12}$$

$$h_q := \begin{bmatrix} h_q(0) \\ \vdots \\ h_q(L) \end{bmatrix} \tag{13}$$

$$H_p^b = \begin{bmatrix} h(n_p; L) & \cdots & h(n_p; 0) & \cdots & 0 \\ & \ddots & & \ddots & \\ 0 & \cdots & h(n_p + N_{b,p} - L - 1; L) & \cdots & h(n_p + N_{b,p} - L - 1; 0) \end{bmatrix}_{(N_{b,p}-L) \times N_{b,p}} \tag{14}$$

Thus, the input-output relationship in equation (11) can be rewritten according to equation (15) where $\Phi_b$ is given in equation (16) and h is given in equation (17).

$$y_b = \Phi_b h + w_b \tag{15}$$

$$\Phi_b := \begin{bmatrix} D^b_{0,1}B_1 & \cdots & D^b_{Q,1}B_1 \\ \vdots & \cdots & \vdots \\ D^b_{0,P}B_P & \cdots & D^b_{Q,P}B_P \end{bmatrix} \quad (16)$$

$$h := [h_0^T \ldots h_Q^T]^T \quad (17)$$

Relying on the Wiener solution of equation (15) yields the linear MMSE (LMMSE) channel estimator given in equation (18). Equation (18) requires the channel covariance matrix $R_h := E[hh^H]$ to be known at receiver 6.

$$\hat{h} = \frac{1}{\sigma_w^2}\left(R_h^{-1} + \frac{1}{\sigma_w^2}\Phi_b^H \Phi_b\right)^{-1} \Phi_b^H y_b \quad (18)$$

Defining the channel error as $\tilde{h} := h - \hat{h}$, the correlation of the channel error can be expressed according to equation (19) and the mean square error of the LMMSE can be expressed according to equation (20).

$$R_{\tilde{h}} := E[\tilde{h}\tilde{h}^H] = \left(R_h^{-1} + \frac{1}{\sigma_w^2}\Phi_b^H \Phi_b\right)^{-1} \quad (19)$$

$$\sigma_{\tilde{h}}^2 := tr(R_{\tilde{h}}) = tr\left(\left(R_h^{-1} + \frac{1}{\sigma_w^2}\Phi_b^H \Phi_b\right)^{-1}\right) \quad (20)$$

From the definition of $\Phi_b$ in equation (16), it clear that the placement of training symbols within the transmission signal affect $\Phi_b$ and consequently $\sigma_{\tilde{h}}^2$. In the following analysis the following assumption is made.

Assumption 3 It is assumed that the channel coefficients $h_q(l)$ are independent, i.e. $R_h$ is a diagonal matrix with trace $tr(R_h) = 1$.

This assumption does not affect the optimality of the design of the blocks of training symbols developed herein because no channel state information is assumed to be known at transmitter 4.

It can be shown that $\sigma_{\tilde{h}}^2$ in equation (20) is lower bounded by the equality given in equation (21) where the equality holds if and only if $\Phi_b^H \Phi_b$ is a diagonal matrix.

$$tr\left(\left(R_h^{-1} + \frac{1}{\sigma_w^2}\Phi_b^H \Phi_b\right)^{-1}\right) \geq \sum_m \frac{1}{\left[R_h^{-1} + \frac{1}{\sigma_w^2}\Phi_b^H \Phi_b\right]_{m,m}} \quad (21)$$

Therefore, the following condition is required to attain MMSE of the channel:

Condition 3 For a fixed number of training symbols $N_b$ and information-bearing symbols $N_s$, the blocks of training symbols are inserted so that the matrix $\Phi_b^H \Phi_b$ is diagonal.

Although the estimate of channel 8 has been defined in equation (18) and conditions 1-3 are defined, additional parameters of the training symbols affect the performance of communication system 2. The performance of communication system 2 is affected by the performance of the channel estimator given in equation (18), the effective transmission rate $\eta = N_s/N$, the mutual information, as well as bit error rate (BER). In the following analysis the placement, power allocation, and number of training symbols are selected by optimizing an average capacity bound of channel 8. However, it will first be shown that optimizing this average capacity bound also minimizes the MMSE of channel 8.

Because it is not easy to evaluate the average capacity of an unknown random channel that is to be estimated, an upper and a lower bound will be derived instead. In order to design optimal parameters for the training symbols, the lower bound of the capacity is maximized and the upper bound is viewed as a benchmark for the maximum achievable rate.

The total transmit-power per block of symbols 16 is denoted as $\mathcal{P}$ while the power allocated to the information bearing symbols within block 16 is denoted $\mathcal{P}_s$, and the power allocated to the training symbols within block 16 is denoted $\mathcal{P}_b$. Before considering optimal power allocation, assume that $\mathcal{P}_s$ and $\mathcal{P}_b$ are fixed and allow $\hat{H}$ to be any estimator of H given in equation (6). Because training symbols b do not convey information, for a fixed power $\mathcal{P}_s := E[\|s\|^2]$, the conditional mutual information between transmitted information-bearing symbols and received symbols in equation (7) is denoted as $I(y_s; s | \hat{h})$ for each realization of H. The channel capacity averaged over the random channel H is defined according to equation (22) where $p_s(\bullet)$ denotes the probability function of s.

$$c := \frac{1}{N} E\left[\max_{p_s(\cdot), \mathcal{P}_s := E[\|s\|^2]} I(y_s; s | \hat{h})\right] \text{ bits/sec/Hz} \quad (22)$$

Assuming that the channel estimation is perfect, i.e. $\hat{H} = H$, the average capacity is defined according to equation (23).

$$\overline{C} := \frac{1}{N} E\left[\max_{p_s(\cdot), \mathcal{P}_s := E[\|s\|^2]} I(y_s; s | h)\right] \text{ bits/sec/Hz} \quad (23)$$

From equation (7) it is known that $y_s = H_s s + \overline{H}_b \overline{b} + w_s$, where $\overline{H}_b$ is the corresponding channel matrix for $\overline{b}$. Because $\overline{H}_b$ and $\overline{b}$ in equation (7) are known in the ideal case, by defining $y'_s := y_s - \overline{H}_b \overline{b}$, it can be verified that $I(y_s; s | h) = I(y'_s; s | h)$. In order to maximize $I(y'_s; s | h)$, lemma 1 is established.

Lemma 1 If the block of information-bearing symbols s is Gaussian distributed, then the mutual information $I(y'_s | h)$ is maximized. Furthermore, the capacity upper bound in equation (23) can be expressed according to equation (24).

$$\overline{C} := \frac{1}{N} E\left[\max_{R_s, \mathcal{P}_s := E[\|s\|^2]} \log \det\left(I_{N_s + LP} + \frac{1}{\sigma_w^2} H_s R_s H_s^H\right)\right] \text{ bits/sec/Hz} \quad (24)$$

Although s is generally non-Gaussian, if $N_s$ is sufficiently large and s is channel coded or linearly precoded, the s will be approximately Gaussian. Thus, in the following analysis assumption 4 is made.

Assumption 4 It is assumed that the block of information-bearing symbols s is zero-mean with variance $R_s = \mathcal{P}_s I_{N_s}$, and $\mathcal{P}_s := \mathcal{P}_s/N_s$.

The covariance $R_s$ is selected as such because there is no CSI at transmitter 4 and thus non-uniform power-loading has no basis. It is important to note that $\overline{C}$ in equation (23) is an upper bound on the average channel capacity with estimated channels because it expresses the ideal channel capacity without channel estimation error.

In the following analysis the lower bound on average channel capacity with LMMSE channel estimation is derived. It is now assumed that the estimate of H is imperfect and $\hat{H}_s$ is defined as the estimate of $H_s$ and $\tilde{\overline{H}}_b$ is defined as the estimate of $\overline{H}_b$. Because $\overline{b}$ and $\tilde{\overline{H}}_b$ are known, $\hat{H}_b\overline{b}$ is subtracted from $y_s$. Thus, is defined according to equation (25).

$$y'_s := y_s - \tilde{\overline{H}}_b\overline{b} = \hat{H}_s s + (H_s - \hat{H}_s)s + (\overline{H}_b - \tilde{\overline{H}}_b)\overline{b} + w_s \quad (25)$$

Using equations (7) and (25) it can be verified that $I(y'_s; s|\hat{H}_s) = I(y_s; s|\hat{H}_s)$. We then define the error of channel matrices as $\tilde{H}_s := H_s - \hat{H}_s$, $\tilde{\overline{H}}_b := \overline{H}_b - \tilde{\overline{H}}_b$, and $v := \tilde{H}_s s + \tilde{\overline{H}}_b \overline{b} + w_s$. In general, $v$ is non-Gaussian distributed with correlation matrix $R_v := E[vv^H]$ given by equation (26) where $E[\tilde{H}_s s \overline{b}^H \tilde{H}_b^H] = 0$ because s is assumed to be zero-mean Gaussian with covariance $R_s$.

$$R_v = \mathcal{P}_s E[\tilde{H}_s \tilde{H}_s^H] + E[\tilde{H}_b \overline{b}\overline{b}^H \tilde{H}_b^H] + \sigma_w^2 I_{N_s + LP} \quad (26)$$

Because of the non-Gaussianalty of v, it is difficult to obtain a closed form of the average capacity. Lemma 2 proposes a lower bound of average capacity C defined in equation (22).

Lemma 2 When the block of information bearing symbols s is Gaussian distributed with fixed power $\mathcal{P}_s$, the average capacity C in equation (22) is lower bounded according to equation (27).

$$C \geq \frac{1}{N} E\left[\max_{R_s} \log \det\left(I_{N_s+LP} + R_v^{-1}\hat{H}_s R_s \hat{H}_s^H\right)\right] \text{ bits/sec/Hz} \quad (27)$$

A lower-bound which is looser than the r.h.s. of equation (27), but easier to handle is given in equation (28). By substituting $R_s = \mathcal{P}_s I_{n_s}$ into equation (27), equation (28) can be obtained.

$$C \geq \frac{1}{N} E\left[\log \det\left(I_{N_s+LP} + R_v^{-1}\hat{H}_s R_s \hat{H}_s^H\right)\right] := \underline{C} \quad (28)$$

The r.h.s. of equation (28) offers a lower bound on the average capacity of doubly-selective channels. Transmitter 4 selects the parameters of the training symbols so that $\underline{C}$ of equation (28) is maximized. The selected parameters of the training symbols improve both the channel estimator of equation (18) and the associated MMSE of equation (20). The lower bound $\underline{C}$ of equation (28) and the channel MMSE of equation (20) are linked. In order to establish this link, Lemma 3 and Lemma 4 are established.

Lemma 3 Assume conditions 1-3 hold, assumptions 1-4 are true, the power of each information-bearing symbol is $\mathcal{P}_s$, and the lengths of $N_{b,p}$ and $N_{s,p}$ are fixed. Then, maximizing $\underline{C}$ as given in equation (28) is equivalent to minimizing $R_v$ in equation (26) at high signal-to-noise ratio (SNR).

Although $R_v$ depends on the MMSE of the channel $$\sigma_{\tilde{h}}^2$$

as defined in equation (20), the dependence is not explicit. Lemma 4 provides an explicit relationship between $R_v$ and $$\sigma_{\tilde{h}}^2.$$

Lemma 4 Consider a fixed number of training symbols $N_b$ adhering to condition 1 and condition 2. Among all designs of $b_p$ which satisfy condition 3 and lead to identical $R_{\tilde{h}}$, the design which satisfies $N_{b,p} \geq 2L+1$ and has the first L and the last L entries of $b_p$, $\forall p \in [1, P]$ equal to zero, achieves the minimum $R_v$.

Based on Lemmas 3 and 4, condition 2 is modified to form condition 2'.

Condition 2' Each block of training symbols $b_p := [0_L^T \ \overline{b}_L^T 0_L^T]^T$, $\forall p \in [1, P]$ with the length of $\overline{b}_p$, $N_{\overline{b},p} \geq 1$.

Note that the L zeros between the blocks of information-bearing symbols $s_p$, and the length of the blocks of training symbols $\overline{b}_p$ eliminate the inter-sub-block interference. Condition 2' implies that $N_{b,p} \geq 2L+1$. Proposition 1 establishes the link between the channel MMSE in equation (20) and the lower bound $\underline{C}$ in equation (28) based on the assumptions and design conditions currently introduced.

Proposition 1 Assume assumption 1-4 and conditions 1-3 hold true. If $N_{s,p} >> 2L$, $\forall p$, then for fixed $N_{s,p}$ and $N_{b,p}$ the minimization of the channel MMSE in equation (20) is equivalent to the maximization of $\underline{C}$ in equation (28).

In order to prove proposition 1, we define $\psi_{q,i} := E[\tilde{h}_q(l)\tilde{h}_q^*(l)]$, and rely on condition 3 to express the correlation matrix in equation (16) according to equation (29).

$$R_{\tilde{h}} = \text{diag}[\omega_{0,0}, \ldots, \psi_{Q,L}] \quad (29)$$

Figure 3:
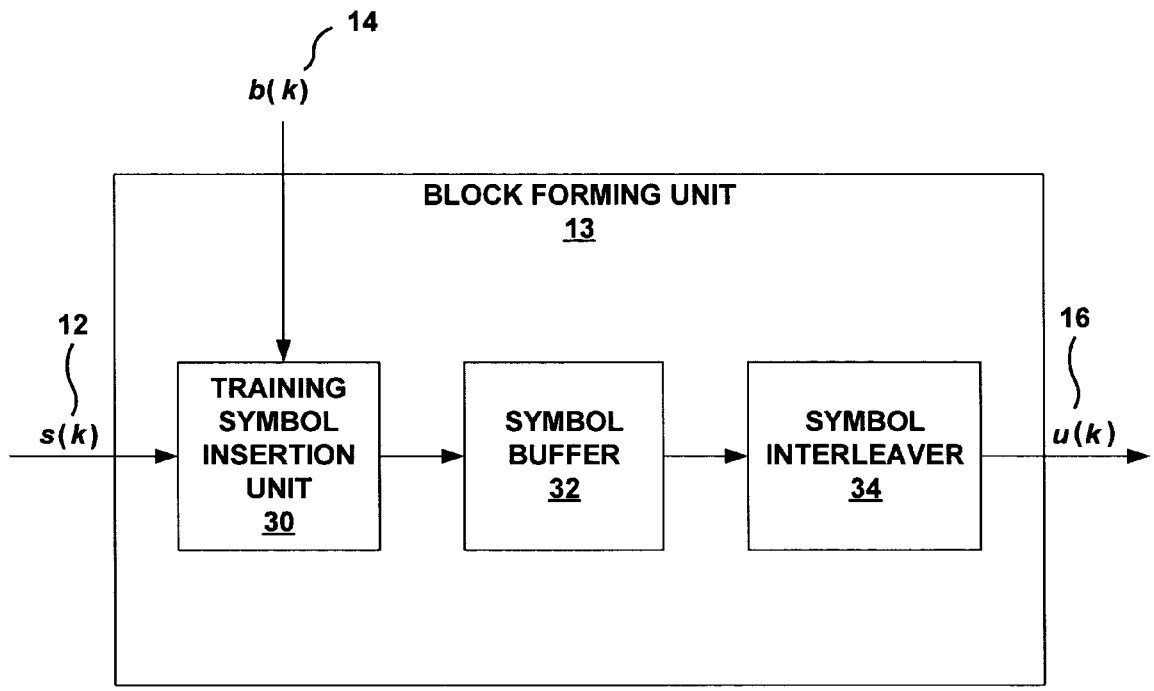
FIG. 3 is a block diagram illustrating an example embodiment of a block forming unit within the transmitter of FIG. 2.

Because $D_q$ is known, $\tilde{H}_s := H_s - \hat{H}_s$ is a block-diagonal matrix as illustrated in greater detail in FIG. 3. Additionally, because $E[\tilde{h}_{q1}(l_1)\tilde{h}_{q2}^*(l_2)] = 0$, $\forall l_1 \neq l_2$, or $\forall q_1 \neq q_2$, the correlation matrix of $\tilde{H}_s$ can be written according to equation (30) where $\tilde{H}_q^s$ is defined according to equation (31) and $\tilde{H}_{q,p}^s$ is a lower triangular Toeplitz matrix with first column $[\tilde{h}_q(0), \ldots, \tilde{h}_q(L), 0, \ldots, 0]^T$.

$$E[\tilde{H}_s \tilde{H}_s^H] = \sum_{q=0}^{Q} D_q E[\tilde{H}_q^s (\tilde{H}_q^s)^H] D_q^H \quad (30)$$

$$H_q^s = \begin{bmatrix} \tilde{H}_{q,1}^s & & \\ & \ddots & \\ & & \tilde{H}_{q,P}^s \end{bmatrix} \quad (31)$$

From equation (29) we can detail equation (30) according to equation (32).

$$E\left[\tilde{H}_{q,p}^s (\tilde{H}_{q,p}^s)^H\right] = \quad (32)$$

$$\text{diag}\left[\psi_{q,o} \sum_{l=0}^{1} \psi_{q,l} \ \cdots \ \sum_{l=0}^{L} \psi_{q,l} \ \cdots \ \sum_{l=0}^{L} \psi_{q,l} \ \cdots \ \psi_{q,L}\right]$$

Equation (32) shows that the correlation matrix of $\tilde{H}_q^s$, and thus $\tilde{H}_s$, is a diagonal matrix. In addition, selecting $N_{s,p} >> 2L$ the correlation matrix of $\tilde{H}_s$ can be approximated according to equation (33).

$$E[\tilde{H}_s\tilde{H}_s^H] \approx \sum_{q=0}^{Q}\sum_{l=0}^{L} \psi_{q,l} I_{N_s+PL} = \sigma_{\tilde{h}}^2 I_{N_s+PL} \quad (33)$$

Considering condition 2' and condition 3, the correlation matrix $R_v$ in equation (26) can then be expressed according to equation (34).

$$R_v \approx \sigma_{\tilde{h}}^2 \mathcal{P}_s I_{N_s+PL} + \sigma_w^2 I_{N_s+PL} \quad (34)$$

It can be deduced from equation (34) that as the channel MMSE $\sigma_{\tilde{h}}^2$ decreases, $R_v$ decreases and from Lemma 3, it is inferred that $\underline{C}^h$ increases accordingly. In other words, better channel estimation implies higher average capacity.

In the following analysis the link between the LMMSE channel estimation with the maximum lower bound of the average channel capacity is used to design optimal training parameters. In particular, the placement, number, and power of the training symbols are selected.

Because the LMMSE channel estimator of equation (18) was adopted the analysis begins from equations (18)-(20). First, $\Phi_b$, which is dependent on $B_p$ as per equation (12), is designed so that $\sigma_{\tilde{h}}^2$ is minimized subject to the power constraint on the totally power of training symbols. As a result of condition 3, the r.h.s. of equation (20) satisfies the equality given in equation (35) where the second equality holds if and only if $\Phi_b^H \Phi_b = \mathcal{P}_b I$.

$$\sigma_{\tilde{h}}^2 \sum_m \frac{1}{\left[R_h^{-1} + \frac{1}{\sigma_w^2}\Phi_b^H \Phi_b\right]_{m,m}} \geq \sum_m \frac{1}{\left[R_h^{-1} + \frac{\rho_b}{\sigma_w^2}I\right]_{m,m}} \quad (35)$$

Based on the structure of $\Phi_b$ it can be inferred that two conditions given in equations (36) and (37) need to be fulfilled.

$$\sum_{p=1}^{P} B_p^H B_p = \rho_b I_{N_{b,p}}; \quad (36)$$

$$\sum_{p=1}^{P} B_p^H D_{q1,p}^H D_{q2,p} B_p = 0, \forall\, q_1 \neq q_2 \quad (37)$$

It is difficult to obtain a general placement of training symbols satisfying equations (36) and (37). Lemma 5 provides further insight as to the optimal placement of training symbols.

Lemma 5 For a fixed number of training symbols $N_b$, information-bearing symbols $N_s > 2L$, power $\mathcal{P}_s$, and number of sub-blocks P per bock. If $N_s$ is an integer multiple of P, then equally long information sub-blocks maximize the lower bound of capacity $\underline{C}$. The length of the sub-blocks of information-bearing symbols is $\overline{N}_s := N_s/P$.

Proposition 2 provides sufficient conditions to achieve placement satisfying equations (26) and (37).

Proposition 2 Assume assumptions 1-4 hold true. For fixed $\mathcal{P}_s$ and $\mathcal{P}_b$ the following placement is optimal is optimal: all sub-blocks of information-bearing symbols have identical block lengths, i.e. $N_{s,p} = \overline{N}_s$, $\forall p$; the blocks of training symbols have identical structure $[0_L^T b 0_L^T]^T$, $\forall p$, and are equi-powered with $b = \overline{\rho}_b := \mathcal{P}_b/P$.

In order to prove proposition 2, we first confirm the conditions 1-3 hold true. According to proposition 1 we will verify that $\underline{C}$ is maximized and check whether $\sigma_{\tilde{h}}^2$ is also minimized.

If $\forall p$, $N_{\overline{b},p} = 1$, and $B_p = \sqrt{(\rho_b)} I_{L+1}$, then $B_p^H B_p = \overline{\rho}_b I_{L+1}$. Therefore, $$\sum_{p=1}^{P} B_p^H B_p = \rho_b I_{L+1}$$

is a diagonal matrix. Thus, condition 1 is satisfied. Substituting $B_p$ into the left hand side (l.h.s.) equation (37) results in the equality given in equation (38) where $\overline{D}_{q2,p}$ includes the first L+1 columns and the first L+1 rows of $\overline{D}_{q,p}$.

$$\overline{D}_{q1,p}^H \overline{D}_{q2,p} = \quad (38)$$
$$e^{j\frac{2\pi}{N}(q_2-q_1)(\overline{N}_s+2L+1)(p-1)} \cdot diag[1, e^{j\frac{2\pi}{N}(q_2-q_1)}, \ldots e^{j\frac{2\pi}{N}(q_2-q_1)(\overline{N}_s+L)}]$$

Because the BEM frequencies are equi-spaced, it follows that $N_{s,p} = \overline{N}_s$ and $N_{b,p} = 2L+1$. By defining the difference between two consecutive BEM frequencies as $w_q - w_{q-1} = 2\pi/N$ we obtain equation (39).

$$\overline{D}_{q1,p}^H \overline{D}_{q2,p} = \quad (39)$$
$$e^{j\frac{2\pi}{N}(q_2-q_1)(\overline{N}_s+2L+1)(p-1)} \cdot diag[1, e^{j\frac{2\pi}{N}(q_2-q_1)}, \ldots e^{j\frac{2\pi}{N}(q_2-q_1)(\overline{N}_s+L)}]$$

Thus, the transmitted block length should be $(\overline{N}_s+2L+1)P$. Thus, equation (40) implies that that the proposed placement satisfies equation (37) and condition 3 which is defined according to equation (41).

$$\sum_{p=1}^{P} \overline{D}_{q1,p}^H \overline{D}_{q2,p} = \begin{cases} P I_{L+1} & q_1 = q_2 \\ 0 & q_1 \neq q_2 \end{cases} \quad (40)$$

$$\Phi_b^H \Phi_b = \rho_b I_{(Q+1)(L+1)} \quad (41)$$

The MMSE in equation (35) has thus been achieved and $\underline{C}$ has been maximized per proposition 1.

Using proposition 2, the structure of the block of symbols is given according to equation (42) and we have obtained that $N_{b,p} = 2L+1$. In order to satisfy the equality in equation (10), the number of sub-blocks of training symbols per block of symbols transmitted must satisfy P (Q+1).

$$u = [s_1^T 0_L^T b 0_L^T \ldots s_P^T 0_L^T b 0_L^T]^T, b = \sqrt{\rho_b} \quad (42)$$

Proposition 3 states the relationship between the number of training symbols per sub-block and the performance of communication system 2.

Proposition 3. If the powers $\mathcal{P}_s$ and $\mathcal{P}_b$ are fixed, the number of sub-blocks $P \geq (Q+1)$, and the number of training symbols per block of training symbols $N_{b,p} \geq (2L+1)$, then as $N_{b,p}$ $\forall$,p and/or P increase, $\underline{C}$ decreases.

Note that when $N_{b,p} < 2L+1$ and $P < Q+1$, the minimum $R_v$ in equality (35) cannot be guaranteed as per Lemma 4.

In the following analysis, we derive the channel MMSE and average capacity with optimal placement of training symbols. Equation (42) gives the optimal placement of training and information-bearing symbols per block u(k) 16 that maximizes $\underline{C}$ and minimizes the LMMSE channel estimation error. Using the Gaussian channel assumption, the latter coincides with the channel MMSE, and thus provides a benchmark for estimation performance when $R_h$ is known at receiver 6. In particular, the following analysis derives this benchmark MMSE for the optimal placement of training and information-bearing symbols when $R_h$ is known, and also when $R_h$ is unknown. Furthermore, a closed form of the maximum lower bound on average channel capacity $\underline{C}$ when the optimum placement of symbols given in equation (42) is used. It is important to note that this allows the optimal average-rate possible through doubly-selective fading channels to be predicted when optimal training is adopted for channel estimation.

If the channel coefficients are independent, but not necessarily identically distributed, substituting equation (41) into equation (19) allows $R_{\tilde{h}}$ to be expressed according to equation (43) where $\sigma_{Q,L}^2$ is the variance of $h_q(l)$. The $\mathrm{tr}(R_{\tilde{h}})$ benchmarks the performance of channel estimation unit 21 when the channel coefficients are independent with known variances.

$$R_{\tilde{h}} = \mathrm{diag}\left[\frac{\sigma_{0,0}^2 \sigma_w^2}{\sigma_w^2 + \rho_b \sigma_{0,0}^2} \cdots \frac{\sigma_{Q,L}^2 \sigma_w^2}{\sigma_w^2 + \rho_b \sigma_{Q,L}^2}\right] \quad (43)$$

For channel estimation, the structure of the blocks symbols given in equation (42) is optimal. Note that for a fixed $\mathcal{P}_b$, when $N_{b,p}=2L+1$ the optimal $\mathrm{tr}(R_{\tilde{h}})$ will not decrease so long as $P(Q+1)$ because the lower bound of $\mathrm{tr}(R_{\tilde{h}})$ in equation (35) holds for any P. On the other hand, as $\mathcal{P}_b$ increases, $R_{\tilde{h}}$ will decrease monotonically. However, the mutual information should also be taken into account. Because $\mathcal{P}$ is fixed, the more power allocated to the training symbols the less power is available to be allocated to the information-bearing symbols. Furthermore, as P increases, the bandwidth efficiency decreases. In the following analysis the optimal design of P and power allocation are derived. However, we first summarize the conditions implied by proposition 2 in condition 4, and rewrite $\underline{C}$ based on these conditions.

Condition 4 Select the length of the block of symbols u(k) equal to N as a multiple of P and design each u(k) according to equation (42).

Using equation (43), the correlation matrix of $\tilde{H}_s$ can be simplified. Because $N_{s,p} = \overline{N}_s$, it can be verified that $E[\tilde{H}_{q,p}^s (\tilde{H}_{q,p}^s)^H]$ does not depend on the index p. Defining $\Psi_q := E[\tilde{H}_{q,p}^s (\tilde{H}_{q,p}^s)^H]$, equations (44) and (45) can be written.

$$E[\tilde{H}_q^s (\tilde{H}_q^s)^H] = I_P \hat{\times} \Psi_q \quad (44)$$

$$E[\tilde{H}_s \tilde{H}_s^H] = I_P \otimes \sum_{q=0}^{Q} \Psi_q \quad (45)$$

Because of the zeros surrounding each training symbol in equation (42), $\overline{b}=0$. Thus, the correlation matrix $R_v$ can be expressed according to equation (46).

$$R_v = \sigma_w^2 I + \rho_s \left(I_P \otimes \sum_{q=0}^{Q} \Psi_q\right) \quad (46)$$

Using condition 4, we have equation (47) and from equation (47) equation (48) can be written.

$$E[\hat{h}\hat{h}^H] = \quad (47)$$
$$\mathrm{diag}\left[\frac{\rho_b \sigma_{0,0}^4}{\sigma_w^2 + \rho_b \sigma_{0,0}^2}, \cdots, \frac{\rho_b \sigma_{Q,L}^4}{\sigma_w^2 + \rho_b \sigma_{Q,L}^2}\right] := \mathrm{diag}[\wp_{0,0} \cdots \wp_{Q,L}]$$

$$E[\hat{H}_{q,p}^s (\hat{H}_{q,p}^s)^H] = \mathrm{diag}\left[\wp_{q,0} \sum_{l=0}^{1} \wp_{q,l} \cdots \sum_{l=0}^{L} \wp_{q,l} \cdots \sum_{l=0}^{L} \wp_{q,l} \cdots \wp_{q,L}\right] \quad (48)$$

Because $$E[\tilde{H}_q^s (\tilde{H}_q^s)^H] = \sum_{q=0}^{Q} E[\hat{H}_{q,p}^s (\hat{H}_{q,p}^s)^H],$$

the normalization factor for $E[\tilde{H}_q^s (\tilde{H}_q^s)^H]$ can be obtained according to equation (49).

$$\sigma_{\hat{H}}^2 := \mathrm{tr}(E[\hat{H}_p^s (\hat{H}_p^s)^H]) = \overline{N}_s \sum_{q=0}^{Q} \sum_{l=0}^{L} \wp_{q,l} \quad (49)$$

Consequently, the normalized channel matrix can be expressed according to equation (50).

$$\hat{H}_p^s = \sigma_{\hat{H}} \overline{\tilde{H}}_p^s, \forall p \quad (50)$$

Thus, it can be deduced that the lower bound on average channel capacity is given according to equation (51).

$$\underline{C} = \frac{1}{N} \quad (51)$$
$$\sum_{p=1}^{P} E\left[\log\det\left(I + \overline{\rho}_s \left(\overline{\rho}_s \sum_{q=0}^{Q} \Psi_q + \sigma_w^2 I\right)^{-1} \cdot \sigma_{\hat{H}}^2 H_p^s (H_p^s)^H\right)\right] \text{ bits/sec/Hz}$$

Equation (51) relates the lower bound $\underline{C}$ with the number of sub-blocks P and the signal power $\overline{P}s$ which in turn depends on the placement of the training symbols and the selected allocation of power.

Relying on equations (47) and (48), Lemma 6 is formed.

Lemma 6 If assumption 2 holds true, then all $\overline{H}_p^s$ have identical distribution, $\forall p \in [1, P]$.

Based on lemma 6, the lower bound on the average capacity can be expressed according to equation (52) where $\overline{\tilde{H}}^s$ is used to represent $\overline{\tilde{H}}_p^s$, $\forall p$.

$$\underline{C} = \frac{P}{N} E\left[\log\det\left(I_{\overline{N}_s+L} + \sigma_{\tilde{H}}^2 \overline{\rho}_s \left(\overline{\rho}_s \sum_{q=0}^{Q} \Psi_q + \sigma_w^2 I\right)^{-1} \cdot \hat{\overline{H}}^s (\hat{\overline{H}}^s)^H\right)\right] \quad (52)$$

bits/sec/Hz

Using the eigen-decomposition, $[(\overline{\tilde{H}}^s (\overline{\tilde{H}}^s)^H)] = U \Lambda_H U^H$, where $\Lambda_H := \text{diag}[\lambda_1, \ldots, \lambda \overline{N}_k$ is an $\overline{N}_s \times \overline{N}_s$ diagonal matrix with eigen-values of $[(\overline{\tilde{H}}^s (\overline{\tilde{H}}^s)^H)]$ on its main diagonal, and U is a unitary matrix which contains the corresponding eigen-vectors. Proposition 1 shows that selecting $N \gg 2L$ yields $$R_v \approx \sigma_{\tilde{h}}^2 \overline{\rho}_s I + \sigma_w^2 I.$$

Thus the lower bound on the average channel capacity can be expressed according to equation (53) where in deriving equation (53) the identity $\det(I+AB)=\det(I+BA)$ for matrices A and B with matching dimensions was used.

$$\underline{C} \approx \frac{P}{N} E\left[\log\det\left(I_{N_s} + \frac{\overline{\rho}_s \sigma_{\tilde{h}}^2}{\sigma_{\tilde{h}}^2 \overline{\rho}_s + \sigma_w^2} U \Lambda_H U^H\right)\right] = \quad (53)$$

$$\frac{P}{N} \sum_{k=1}^{\overline{N}_s} E\left[\log\left(1 + \frac{\overline{\rho}_s \sigma_{\tilde{h}}^2}{\sigma_{\tilde{h}}^2 \overline{\rho}_s + \sigma_w^2} \lambda_k\right)\right] \text{ bits/sec/Hz}$$

Note that the $\lambda_k$'s are not identically distributed, in general. This leads to a looser lower bound on the average capacity.

The effective SNR is defined according to equation (54).

$$\rho_{\mathit{eff}} = \frac{\overline{\rho}_s \sigma_{\tilde{h}}^2}{\sigma_w^2 + \overline{\rho}_s \sigma_{\tilde{h}}^2} \quad (54)$$

Since $\overline{N}_s P = N - P(2L+1)$, the looser bound is given by equation (55) where $\lambda_{\min} = \min\{\lambda_k\}_{k=1}^{\overline{N}_s}$.

$$\underline{C} \geq \frac{N - P(2L+1)}{N} E[\log(1+\rho_{\mathit{eff}} \lambda_{\min})] := \underline{C}_a \quad (55)$$

Proposition 2 establishes that the optimal number of pilots per sub-block is $N_{b,p} = 2L+1$ ($N_{\overline{b},p}=1$). In the following analysis, the optimal number of blocks of training symbols $b_p$ per transmission block is considered, i.e. how often the training sub-blocks should be inserted to maximize average channel capacity.

In order to obtain the optimal number of blocks P in equation (55), for fixed N, $\rho_s$ and $\rho_b$, P is treated as a continuous variable. We can then differentiate $\underline{C}_a$ with respect to P to obtain equation (56) where in the second step, the inequality $\ln(1+\chi)$, $\forall \chi > 0$ was used. Because $\partial \underline{C}_a / \partial P < 0$, to achieve the maximum lower bound on the channel capacity, P should be taken to be as small as possible.

$$N \frac{\partial \underline{C}_a}{\partial P} = -(2L+1) E[\log(1+\rho_{\mathit{eff}} \lambda_{\min})] + \quad (56)$$

$$P \overline{N}_s E\left[\log(e) \frac{\rho_{\mathit{eff}} \lambda_{\min}}{1+\rho_{\mathit{eff}} \lambda_{\min}} \frac{(2L+1)\sigma_w^2}{\rho_s \sigma_{\tilde{h}}^2 + P \overline{N}_s \sigma_w^2}\right] \leq$$

$$-E\left[\log(e) \frac{\rho_{\mathit{eff}} \lambda_{\min} (2L+1)}{1+\rho_{\mathit{eff}} \lambda_{\min}} - \right.$$

$$\log(e) \frac{\rho_{\mathit{eff}} \lambda_{\min}}{1+\rho_{\mathit{eff}} \lambda_{\min}} \frac{(2L+1) P \overline{N}_2 \sigma_w^2}{\rho_s \sigma_{\tilde{h}}^2 + P \overline{N}_s \sigma_w^2} =$$

$$-E\left[\log(e) \frac{\rho_{\mathit{eff}} \lambda_{\min}}{1+\rho_{\mathit{eff}} \lambda_{\min}} \frac{(2L+1) \rho_s \sigma_{\tilde{h}}^2}{\rho_s \sigma_{\tilde{h}}^2 + P \overline{N}_s \sigma_w^2}\right] \langle 0$$

Moreover, in order to guarantee the condition in equation (10) with $N_{b,p} = 2L+1$, we must select $P \geq Q+1$. This implies that the optimal number of sub-blocks is $P = Q+1$. Thus, we have established the following proposition.

Proposition 4 Consider transmission of information blocks of length N through time- and frequency-selective random channel 8 modeled as in (1). If conditions 1-4 are satisfied, and a fixed power is allocated to the training symbols, then the lower bound given in (55) is maximized if and only if the number of blocks of training symbols $b_p$ is $P = Q+1$.

Although this result is derived for the looser bound $\underline{C}_a$ in equation (55), it is also true for equation (51). An intuitive explanation is that as P increases, the performance of channel estimation does not improve, but the number of information symbols decreases causing $\underline{C}$ to decrease as well. When $P \leq Q+1$, the mutual information suffers from unreliable channel estimation, since the condition in equation (10) is not satisfied. Note that now the number of pilot symbols is $(Q+1)(2L+1)$, which is the smallest possible since $P = Q+1$.

Thus far, the total power P has been fixed. Based on this, it has been derived that the training symbols must be equi-powered and equi-spaced. In the following analysis the optimal allocation of the total power between information-bearing symbols and training symbols is derived.

The total transmit-power per block of symbols is $P = P_s + P_b$ where $P_s := \alpha P$, and thus $P_b = (1-\alpha)P$ for some $\alpha \in (0,1)$. From equation (49), it can be verified that $$\sigma_{\tilde{h}}^2 = \overline{N}_s (1 - \sigma_h^2)$$

where $\sigma_{\tilde{h}}^2$ is given according to equation (57).

$$\sigma_{\tilde{h}}^2 = \sum_{l=0}^{L} \sum_{q=0}^{Q} \frac{\sigma_{q,l}^2 \sigma_w^2}{\sigma_w^2 + \rho_b \sigma_{q,l}^2} \quad (57)$$

Thus, the effective SNR in equation (54) can be rewritten according to equation (58).

$$\rho_{eff} = \frac{\frac{\alpha\rho}{Q+1}(1-\sigma_{\tilde{h}}^2)}{\sigma_w^2 + \frac{\alpha\rho}{N_s(Q+1)}\sigma_{\tilde{h}}^2} \quad (58)$$

It is difficult to find an optimal power allocation factor $\alpha$ which does not depend on any CSI directly from equation (58), because $\sigma_{\tilde{h}}^2$ depends on $\sigma_{q,l}^2$. Therefore, the following three cases are considered: low SNR, high SNR and identical distributed channel taps.

For low SNR, i.e. $(\sigma_w^2 >> (1-\alpha)P\sigma_{q,l}^2)$, equation (57) can be simplified as $$\sigma_{\tilde{h}}^2 \gtrsim 1 - (1-\alpha)P/\sigma_w^2 \sum_{l=0}^{L}\sum_{q=0}^{Q} \sigma_{l,q}^4 \gtrsim 1 - (1-\alpha)P/\sigma_w^2.$$

Substituting this result into equation (58) gives equation (59).

$$\rho_{eff} \approx \frac{\overline{N}_s\rho^2\alpha(1-\alpha)}{\sigma_w^4(Q+1) + \alpha\rho(\alpha\sigma_w^2 - (1-\alpha)\rho)} \quad (59)$$

The optimal power allocation factor $\alpha$ can be obtained by differentiating $\rho_{eff}$ with respect to the variable $\alpha$ and finding the zero of this differential. Note that $\alpha$ belongs to the range (0,1). Thus, for this case, $\alpha$ is defined according to equation (60).

$$\alpha_{low} = 1/2 \quad (60)$$

For high SNR, i.e. $((1-\alpha)P\sigma_{q,l}^2 >> \sigma_w^2)$ equation (57) gives $$\sigma_{\tilde{h}}^2 \approx (L+1)(Q+1)\sigma_w^2/P_b.$$

Thus, the effective SNR in equation (54) can be rewritten according to equation (61).

$$\rho_{eff} = \frac{\frac{\alpha\rho}{Q+1}\left(1 - \frac{(L+1)(Q+1)\alpha\sigma_w^2}{(1-\alpha)\rho}\right)}{\sigma_w^2 + \frac{\alpha\rho(L+1)\sigma_w^2}{N_s(1-\alpha)\rho}} \quad (61)$$

After differentiating $\rho_{eff}$ with respect to $\alpha$, it is found that at high SNR, the optimal power allocation factor is given according to equation (62).

$$\alpha_{high} = \frac{1 - \left(\frac{L+1}{N_s} + \frac{(L+1)(Q+1)\sigma_w^2}{\rho}\left(1 - \frac{L+1}{N_s}\right)\right)^{1/2}}{1 - \frac{L+1}{N_s}} \quad (62)$$

When the SNR $P/((L+1)(Q+1)\sigma_w^2) \to \infty$, the optimal power allocation factor reduces to equation (63).

$$\alpha_\infty = \frac{1}{1 + \sqrt{(L+1)/\overline{N}_s}} \quad (63)$$

For identical distributed channel coefficients, i.e. $(\sigma_{q,l}^2 = 1/(L+1)(Q+1))$, equation (57) can be rewritten as $$\sigma_{\tilde{h}}^2 = (L+1)(Q+1)\sigma_w^2/(P_b + (Q+1)(L+1)\sigma_w^2).$$

Substituting this result into equation (58) results in the optimal power allocation factor to be given according to equation (64).

$$\rho_{eff} = \frac{\rho^2\overline{N}_s}{\sigma_w^2(Q+1)} \frac{\alpha(1-\alpha)}{\overline{N}_s((L+1)(Q+1)\sigma_w^2 + \rho) - \alpha\rho(\overline{N}_s - (L+1))} \quad (64)$$

Similar to the previous two cases of low and high SNR, after differentiating $\rho_{eff}$ with respect to $\alpha$, the optimal power allocation factor is given according to equation (65) where $\beta = 1 + (L+1)(Q+1)\sigma_w^2/\rho$.

$$\alpha_{iid} = \frac{\beta - \left(\beta^2 - \left(1 - \frac{L+1}{N_s}\right)\beta\right)^{1/2}}{1 - \frac{L+1}{N_s}} \quad (65)$$

When $P/((L+1)(Q+1)\sigma_w^2) \to \infty$, $\alpha_{iid}$ converges to $\alpha_\infty$ in (63). When $P/((L+1)(Q+1)\sigma_w^2) \to \alpha_{iid} \to 1/2$.

Proposition 5 states how the optimal power allocation factor is selected.

Proposition 5 Assume that conditions 14 hold true, and that the SNR is sufficiently high. Using assumptions 1-4 and for a fixed $\overline{N}_s$, the lower bound on average capacity is maximized with the MMSE channel estimator when the power allocation factor $\alpha$ is given by (60), (62), or (65).

Thus, techniques for performing channel estimation which minimize the channel MMSE and maximize the average capacity have been described herein.

FIG. 3 is a block diagram illustrating an example embodiment of block forming unit 13 (FIG. 2) within transmitter 4. In this embodiment, block forming unit 13 comprises a training symbol insertion unit 30 that inserts blocks of training symbols 14 within blocks of information-bearing symbols 12 according to equation (42). Symbol buffer 32 receives and stores the symbols in array fashion in which the symbols are written into the symbol buffer in a row-wise fashion, with each row storing Q+1 symbols. The structure of symbol buffer 32 is described in greater detail in FIG. 4. Symbol interleaver 34 outputs symbol blocks 16 by reading the symbols from symbol buffer 32 in a column-wise fashion.

Figure 4A:
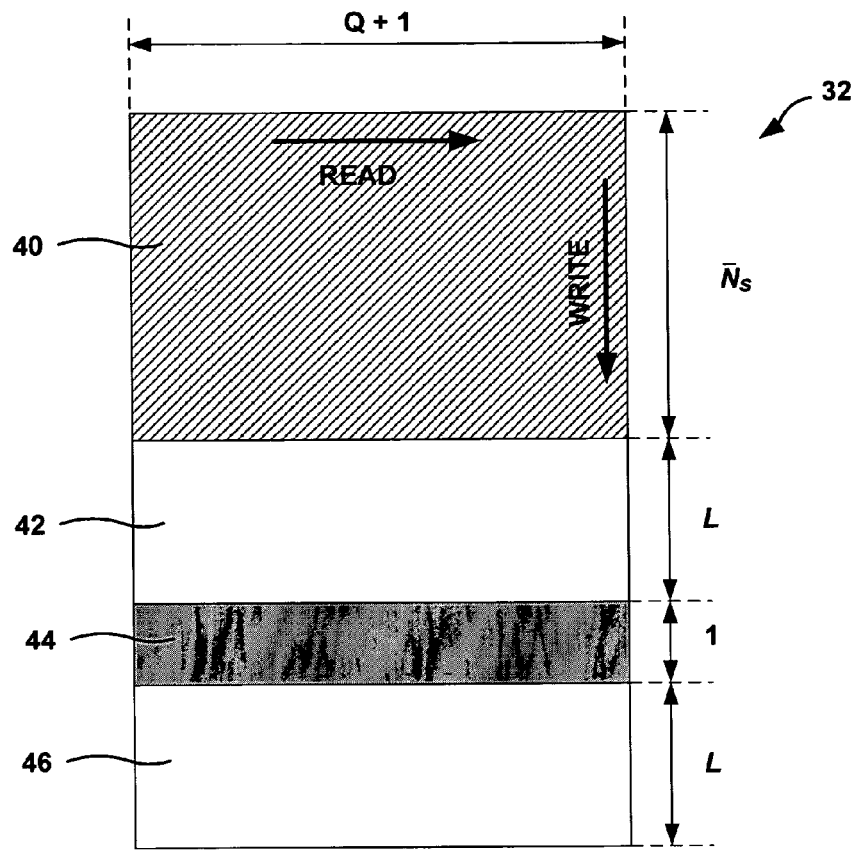
FIG. 4A illustrates an example arrangement of symbols stored within a symbol buffer in array format.

FIG. 4A illustrates an example arrangement of symbols within symbol buffer 32. In this arrangement, the information-bearing symbols are organized as an $\overline{N}_s \times (Q+1)$ matrix 40 followed by $L \times (Q+1)$ zero symbols 42, Q+1 training symbols 44, and another $L \times (Q+1)$ zero symbols 46. Each column of symbol buffer 32 denotes a read-out operation producing blocks of symbols 16, which are described in greater detail in FIG. 4B, while each row denotes a write-in operation.

Figure 4B:
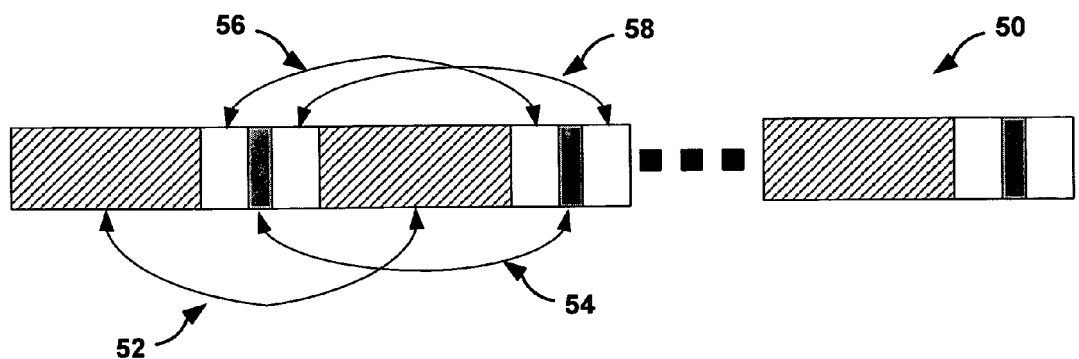
FIG. 4B illustrates an example stream of symbols generated by a block forming unit within the transmitter.

FIG. 4B illustrates an example stream 50 of blocks of symbols generated by block forming unit 13 within transmitter 4. In particular the stream 50 of symbol blocks is generated by reading symbol buffer 32 in a column-wise fashion. The structure of stream 50 satisfies equation (42) with blocks of information-bearing symbols 52 separated by blocks of training symbols, each block of training symbols having a training symbol 54, which may be a zero or a non-zero symbol, with the first L and last L training symbols, 56 and 58 respectively, being zero symbols.

Figure 5:
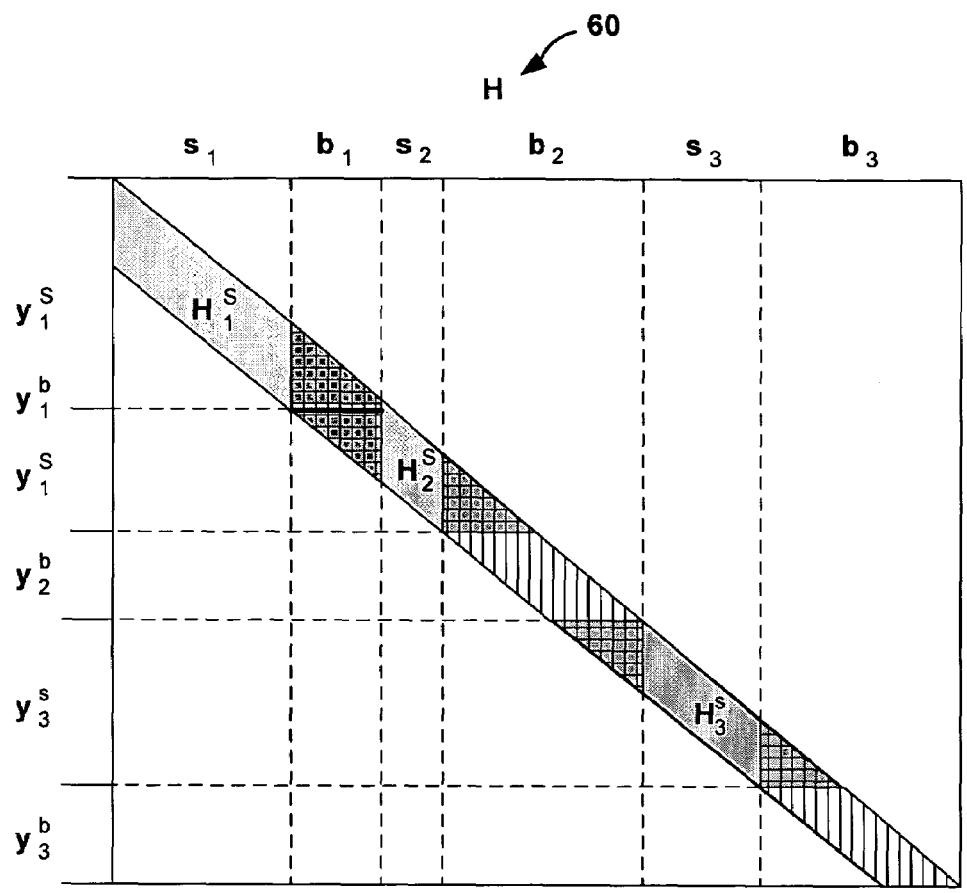
FIG. 5 illustrates an example matrix which models the wireless communication channel of FIG. 2.
Figure 5:
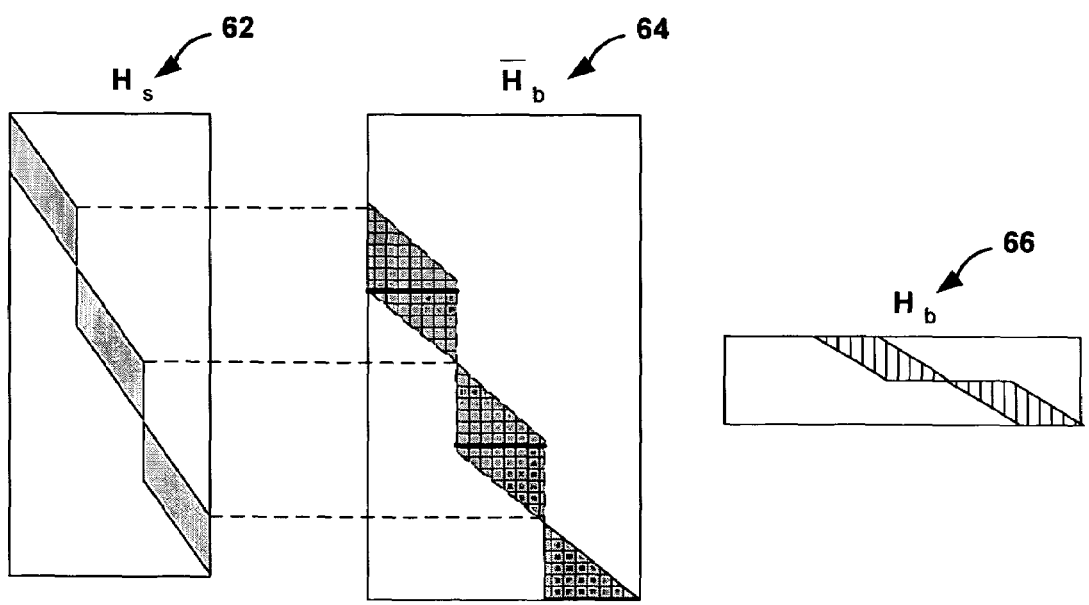

FIG. 5 illustrates example matrix H 60, which models the wireless communication channel of FIG. 2, and from which matrices $H_s$ 62, $\overline{H}_b$ 64, $H_b$ 66 are constructed. Each of matrices $H_s$ 62, $\overline{H}_b$ 64, $H_b$ 66 are constructed from sub-blocks of H corresponding to vectors s, $\overline{b}$, and b respectively.

Figure 6:
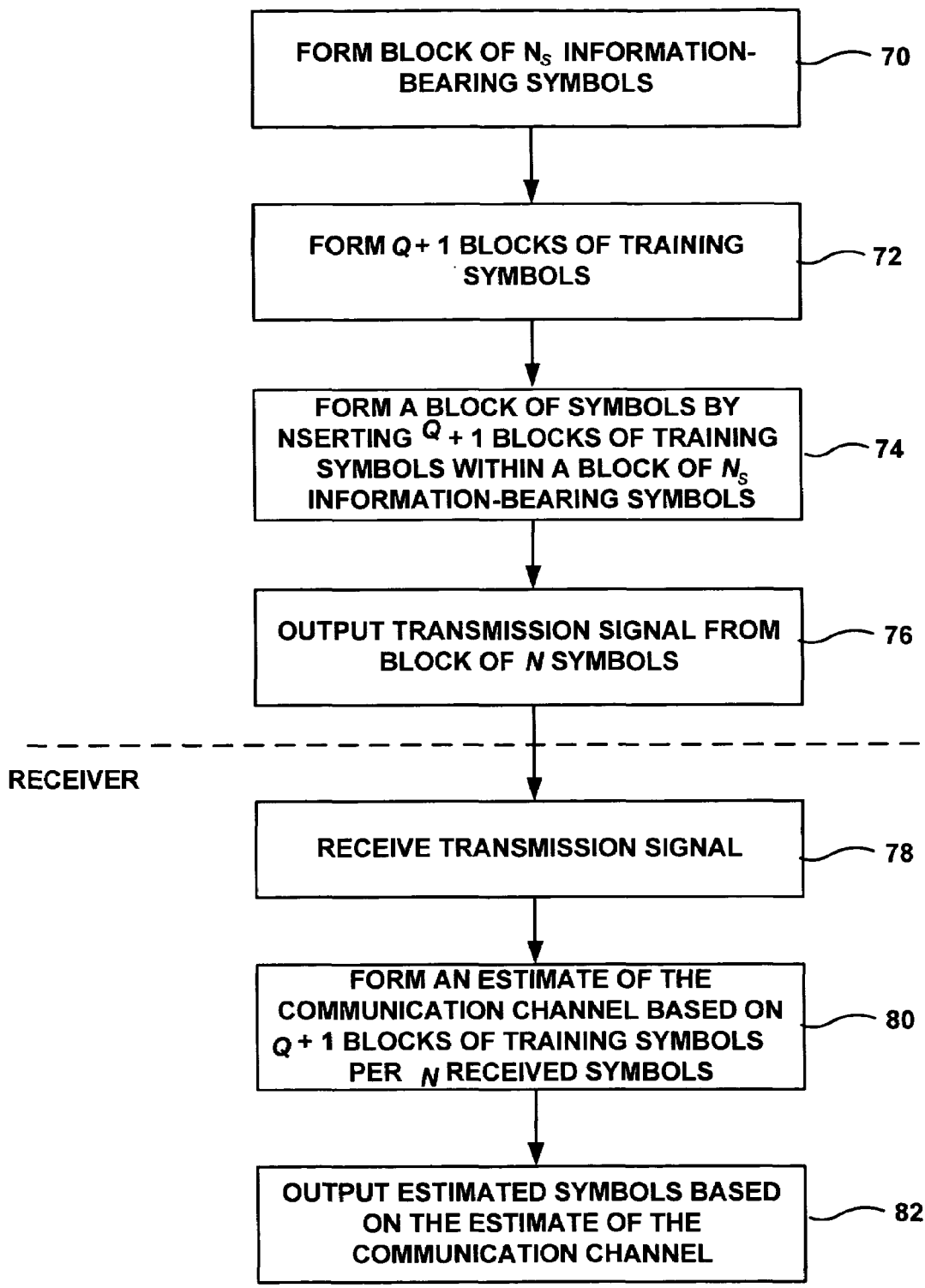
FIG. 6 is a flowchart illustrating an example mode of operation of the multi-user wireless communication system of FIG. 2 in which a receiver performs channel estimation on a wireless communication signal in accordance with the techniques described herein.

FIG. 6 is a flowchart illustrating an example mode of operation of multi-user wireless communication system 2 in which receiver 6 performs channel estimation on a wireless communication signal in accordance with the currently described techniques.

Generally, transmitter 4 forms a block of $N_s$ information-bearing symbols s(k) 12 (step 70) and forms Q+1 blocks of $N_b$ training symbols b(k) 14 (step 72). In particular, $b_p(k)$ 14 is formed according to lemma 4 with $N_{b,p} \geq 2L+1$ training symbols, of which the first L and the last L training symbols are zeros.

After forming the blocks of information-bearing symbols and blocks of training symbols, transmitter 4 forms a block N of symbols by inserting Q+1 blocks of training symbols within a block of $N_s$ information-bearing symbols (step 74). In some embodiments, transmitter 4 inserts Q+1 blocks of training symbols in accordance with equation (42) so that each block of training symbols is equally spaced by $\overline{N}_s = N_s/(Q+1)$ information-bearing symbols.

Transmitter 4 then outputs a wireless transmission signal from the block of N symbols over doubly-selective wireless communication channel 8 (step 76). Transmitter 4 allocates equal power $P_s$ to each block of information-bearing symbols and also allocates equal power $\overline{P}_s$ to each information-bearing symbol with a block of information-bearing symbols. Similarly, transmitter 4 also allocates each block of training symbols equal power $P_b$ and also allocates equal power $\overline{P}_b$ to each training symbol within a block of training symbols. Furthermore, in order to maximize the average channel capacity, the total transmit-power allocated to the information-bearing symbols per block of symbols and the total transmit-power allocated to the training symbols per block of symbols is $P_s = \alpha P$ and $P_b = (1-\alpha)P$ respectively, where α is defined according to equations (60), (62), and (65) for low SNR, high SNR, and identical distributed channel coefficient transmissions, respectively.

Receiver 6 receives the wireless transmission signal formed from the block of N symbols (step 78) and forms an estimate of communication channel 8 based on the Q+1 blocks of training symbols received per N symbols (step 80). Because of the design of the blocks of training symbols, the LMMSE estimate of communication channel given in equation (18) is minimized. Receiver 6 then outputs estimated symbols based on the estimate of communication channel 8 (step 82).

FIGS. 7-12 are graphs illustrating performance estimates of the channel estimation techniques described herein. Unless otherwise mentioned, in all test cases the transmitted block size is N=63, the number of information symbols $N_s$=42, and the quadrature phase-shift key (QPSK) modulation is used. The doubly-selective channel model is generated using the following parameters: carrier frequency $f_0$=2 GHz, sampling period $T_s$=53.6 μs, and mobile speed $v_{max}$=160 km/hr. Thus, the maximum frequency shift is found to be $f_{max} \approx 296.30$ Hz. With these parameters, it is found that Q=2. The channel order is L=3. All the channel coefficients $h_q(l)$ are generated as independent, standardized, complex Gaussian random deviates. The multipath intensity profile is selected as $\phi_c(\tau) = \exp(-0.1\tau/T_s)$, $\forall_q$, and the Doppler power spectrum is chosen as $S_c(f) = (\pi\sqrt{f_{max}^2 - f^2})^{-1}$ when $f \leq f_{max}$; otherwise the spectrum $S_c(f) = 0$, $\forall l$. The variance of $h_q(l)$ is defined as $\sigma_{q,l}^2 := \gamma \phi_c(lT_s) S_c(2\pi q/(NT_s))$, where $\gamma := (\Sigma_{l,q} \phi_c(lT_s) S_c(2\pi q/(NT_s)))^{-1}$ denotes the normalizing factor. The signal-to-noise ration (SNR) is defined as $P/(N-2L(Q+1))/\sigma_w^2$.

Figure 7:
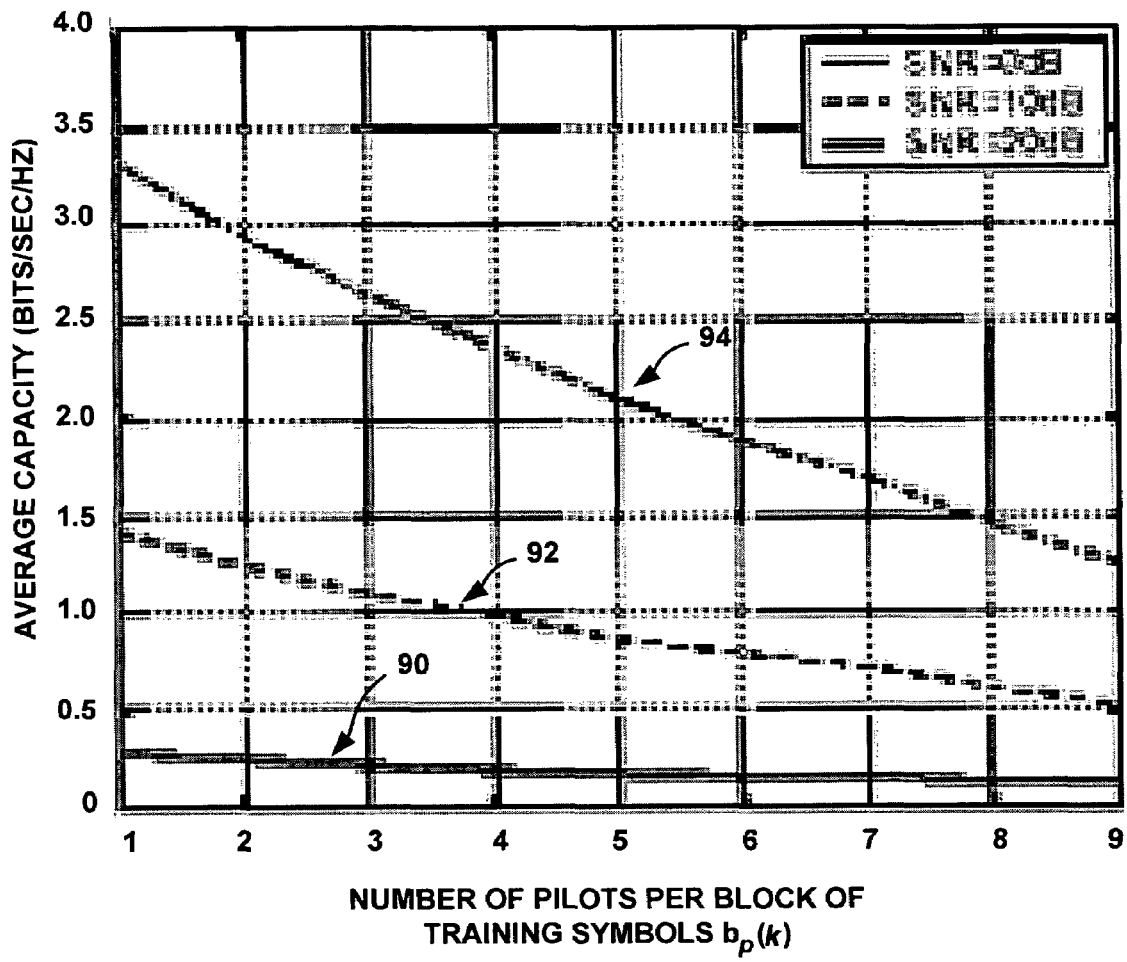
FIGS. 7-12 are graphs illustrating exemplary performance estimates of the channel estimation techniques described herein.

FIG. 7 is a graph comparing the number of the non-zero training symbols $N_{\overline{b},p}$ and the lower bound on average channel capacity given in equation (51). We let $N_{\overline{b},p} = N_{\overline{b}}$, $\forall p$, and adopt the other optimal parameters currently described while allowing $N_{\overline{b}}$ to vary. FIG. 7 illustrates how the capacity bound decreases monotonically as $N_{\overline{b}}$ increases for each SNR value considered, 0 dB (plot 90), 10 dB (plot 92), and 20 dB (plot 94). Furthermore, as the SNR increases, the effect of $N_{\overline{b}}$ increases. This validates the claim in Proposition 3.

Figure 8:
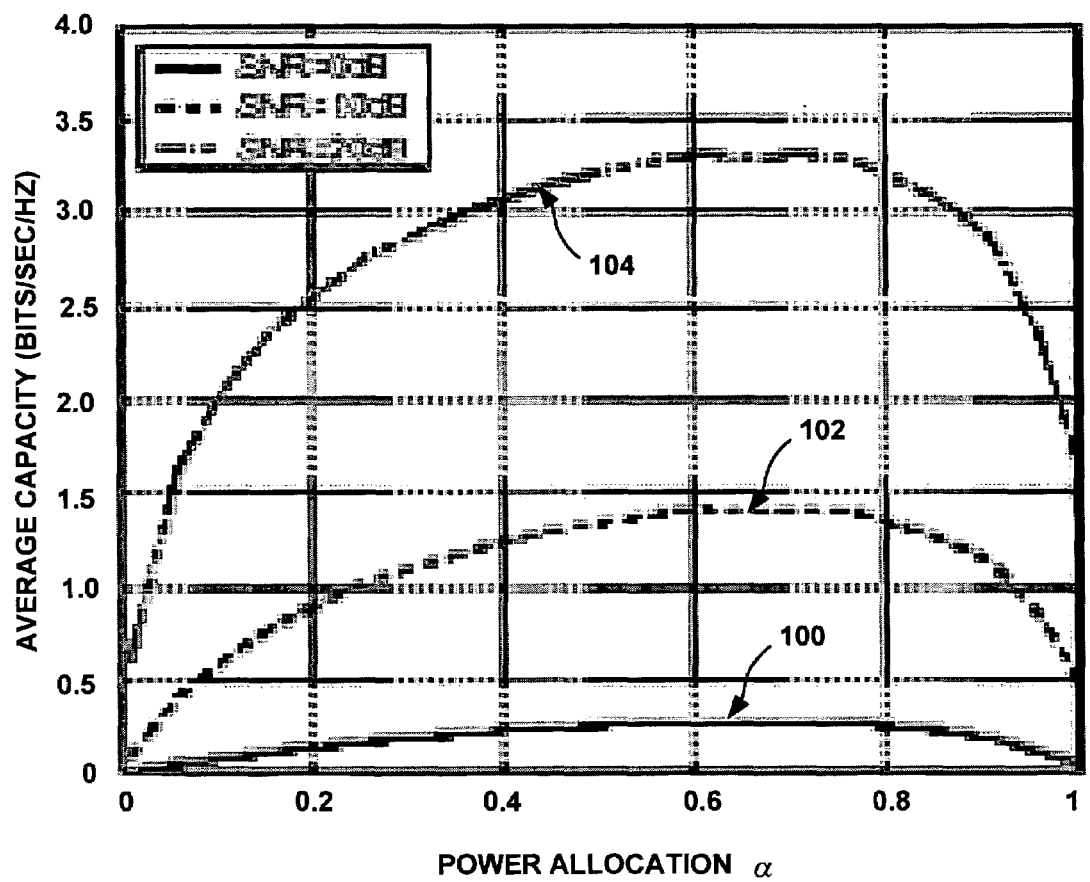

FIG. 8 is a graph comparing the power allocation factor α and the lower bound on average channel capacity given in equation (51). FIG. 8 illustrates that when α is too small (near 0), the average capacity is small since the information symbols do not have enough power to combat AWGN for each SNR value considered, 0 dB (plot 100), 10 dB (plot 102), and 20 dB (plot 104). In contrast, when α is too large (near 1), the average capacity is also small for each SNR value since the training symbols do not have enough power to provide reliable channel estimation. From equation (62), the optimal α≈0.65 in the simulations is also verified by inspecting the maximum in FIG. 7.

Figure 9:
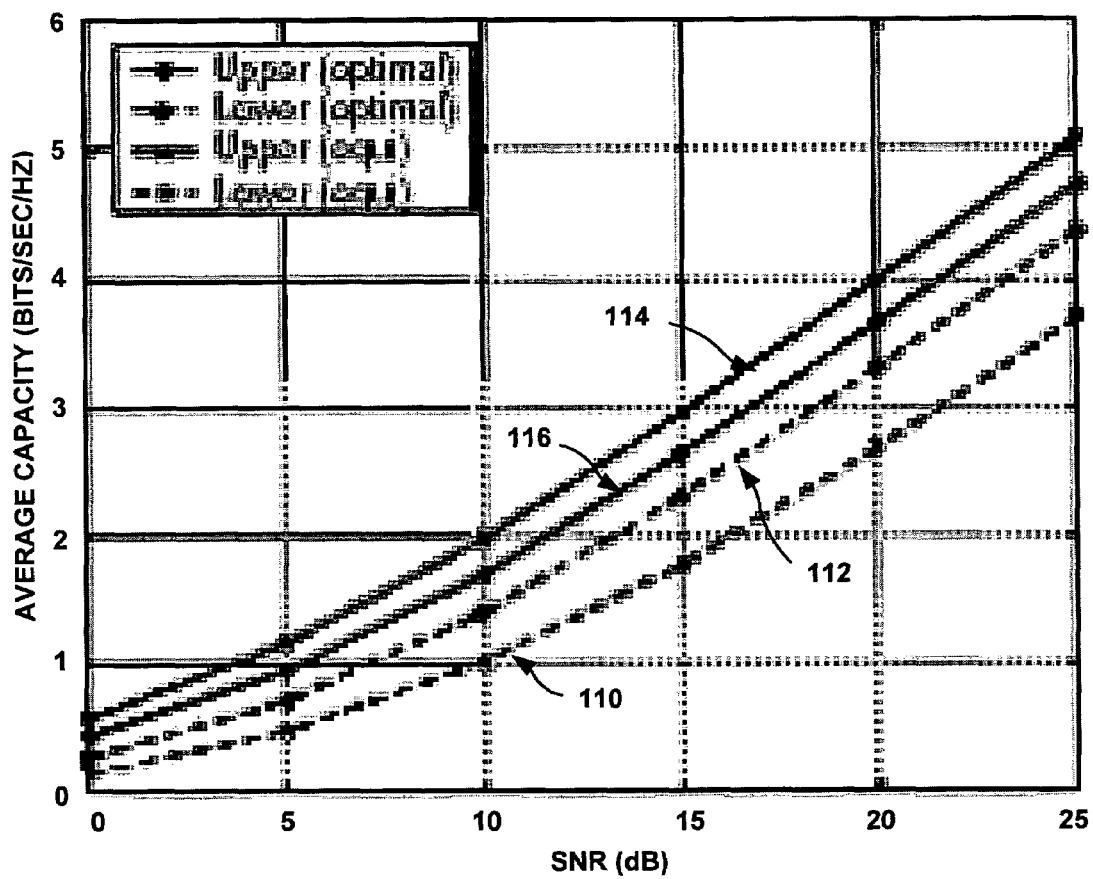

FIG. 9 is a graph comparing the currently described design with a PSAM design having $\overline{P}_b = \overline{P}_s$ and otherwise having parameters selected according to the currently described design. For this case, the power allocation factor is $\alpha = \overline{N}_s/(1 + \overline{N}_s) \approx 0.93$. From Eq. (62), the optimal α≈0.65. FIG. 9 depicts the lower and upper bounds for both cases. Note that for the optimal allocation, the lower bound (plot 112) is closer to the upper bound (116) than for the equi-powered PSAM with lower bound (plot 110) and upper bound (114). Thus, optimal power allocation results in improved performance. Furthermore, the lower bound for the optimal PSAM (plot 112) is higher than that of equi-powered PSAM (plot 110) since more power is allocated for training in the optimal case. Similar reasoning explains why the upper bound of the equi-powered PSAM (plot 114) is higher than that of the optimal PSAM (plot 116).

Figure 10:
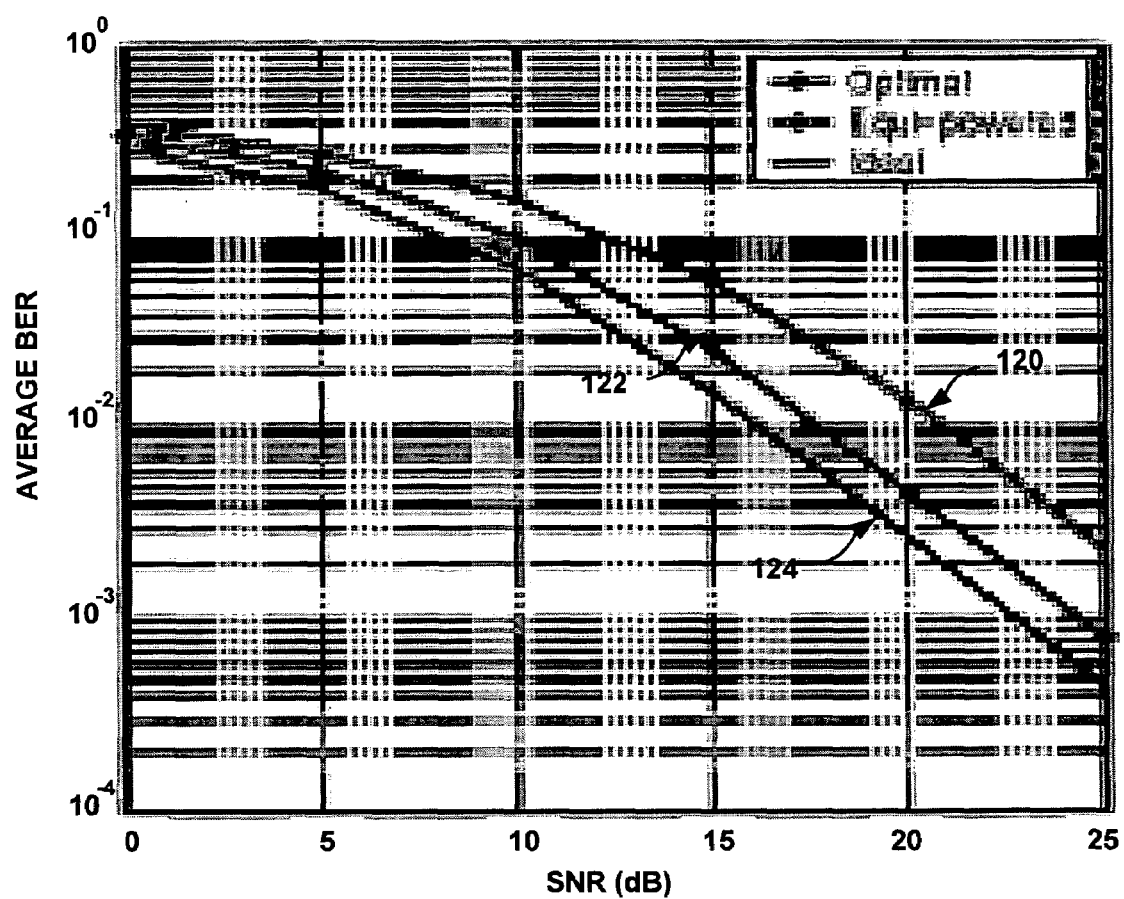

FIG. 10 is a graph comparing the bit-error rate (BER) performance vs. SNR of the currently described design with a PSAM design having $\overline{P}_b = \overline{P}_s$ and otherwise having parameters selected according to the currently described design. It can be observed that compared with the equi-powered PSAM (plot 120), the optimal design (plot 122) gains 3 dB and $10^{-2}$. The ideal case (plot 124) with perfect channel estimates is also plotted as a benchmark. FIG. 10 shows that the SNR penalty for channel estimation error is only about 1.5 dB if we adopt the optimal α.

Figure 11:
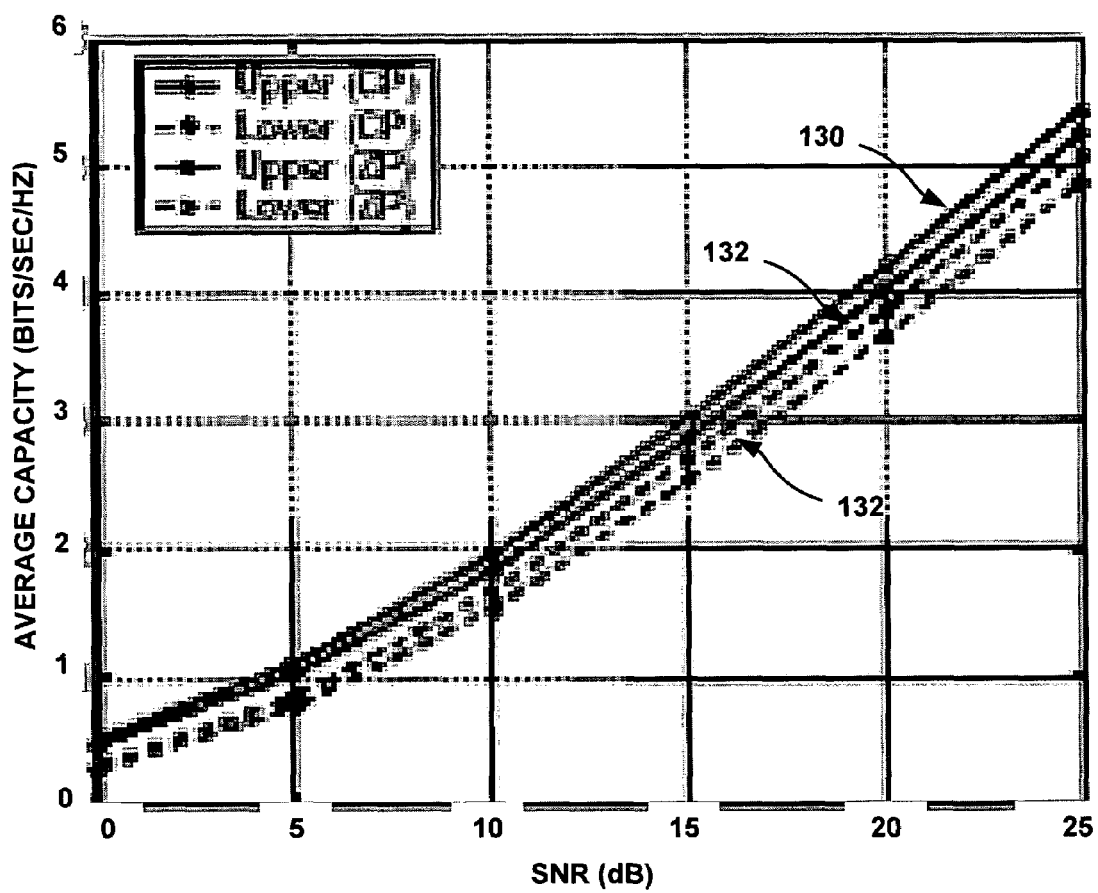

FIG. 11 is a graph comparing the average channel capacity for varying SNRs of the currently described techniques which utilize zero padding (ZP) with techniques utilizing cyclic prefix (CP) insertion, as described in S. Adireddy, L. Tong, and H. Viswanathan, "Optimal Placement of Training for Unknown Channels," IEEE Transactions on Information Theory, vol. 48, no. 8, pp. 2338-2353, August 2002 and S.

Ohno and G. B. Giannakis, "Capacity Maximizing Pilots for Wireless OFDM over Rapidly Fading Channels," IEEE Transactions on Information Theory, 2003. The channel is frequency-selective with i.i.d. taps. The channel order L=7, and each tap is a zero mean Gaussian random variable with variance $1/(L+1)$. The number of information symbols per block is $\overline{N}_s=48$, and the block length $N=\overline{N}_s+2L+1$. So for CP-based training, the CP length is L. The total power per block is fixed to P. Hence, the power ratio allocated between information symbols and training symbols for the CP-based scheme, is $P(\overline{N}_s+L+1)/N$. FIG. 11 depicts the average capacity bounds for both the ZP- and CP-based alternative with $SNR:=P/(\overline{N}_s+1)$. For ZP-based training, the capacity upper (plot 130) and lower bounds (132) are plotted using (24) and (51) with Q=0. For CP-based training, the capacity upper and lower bounds, (plot 136) and (plot 134) respectively, are plotted according to the previously referenced paper authored by S. Ohno and G. B. Giannakis. FIG. 11 shows the bounds (either upper or lower) for ZP are consistently greater than those of CP, which is partially due to the power loss incurred by the CP.

Figure 12:
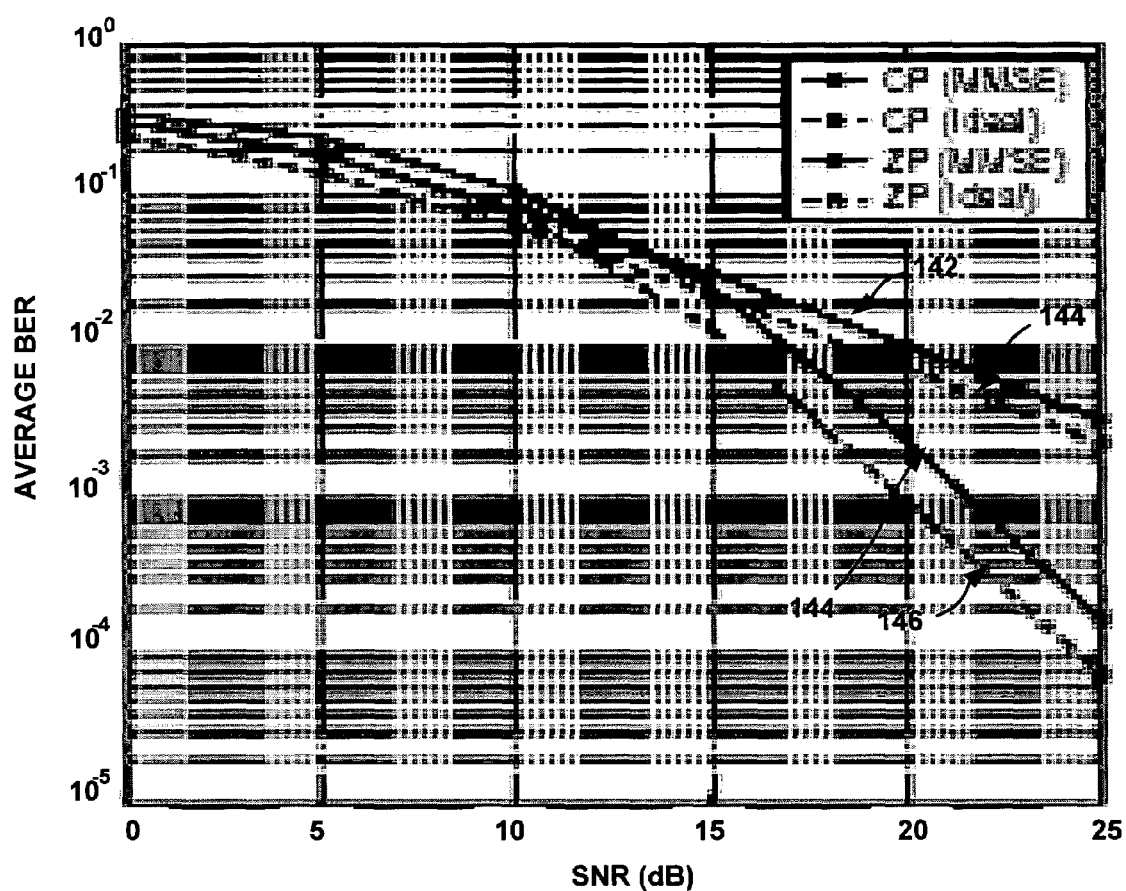

FIG. 12 is a graph comparing BER for varying SNRs of a system using the currently described techniques which utilize zero padding (ZP) with techniques utilizing cyclic prefix (CP). FIG. 12 plots the performance of both techniques using ideal channel estimates, CP (plot 140) and ZP (plot 146), and with computed MMSE channel estimates, CP (plot 142) and ZP (plot 144). The computed MMSE channel estimates are based on training symbols and use zero-forcing (ZF) equalization for symbol detection in both cases. From FIG. 12, it is observed that ZP outperforms CP at high SNR, while CP has about 2 dB advantage at BER-0.1. Additionally, from the slopes of the curves, it is observed that CP offers lower diversity order than ZP, and for both cases, the penalty for inaccurate channel state information is about 1.5 dB.

The described techniques can be embodied in a variety of transmitters and receivers used in downlink operation including cell phones, laptop computers, handheld computing devices, personal digital assistants (PDA's), and other devices. The devices, such as transmitter 4 or receiver 6 of FIG. 2, may include a digital signal processor (DSP), field programmable gate array (FPGA), application specific integrated circuit (ASIC) or similar hardware, firmware and/or software for implementing the techniques. If implemented in software, a computer readable medium may store computer readable instructions, i.e., program code, that can be executed by a processor or DSP to carry out one of more of the techniques described above. For example, the computer readable medium may comprise random access memory (RAM), read-only memory (ROM), non-volatile random access memory (NVRAM), electrically erasable programmable read-only memory (EEPROM), flash memory, or the like. The computer readable medium may comprise computer-readable instructions that when executed in a wireless communication device, cause the wireless communication device to carry out one or more of the techniques described herein. These and other embodiments are within the scope of the following claims.

The invention claimed is:

1. A method comprising:
   determining a delay-Doppler spread factor of a wireless communication channel;
   forming, by a block forming unit of a communication device, a block of symbols that includes at least Q blocks of training symbols separated by at least one information-bearing symbol, where Q is a function of the delay-Doppler spread factor of the wireless communication channel, wherein each block of training symbols has two or more training symbols, and wherein forming the block of symbols comprises forming each of the blocks of training symbols to include a first block of zero symbols and a second block of zero symbols, the first block of zero symbols and the second block of zero symbols being separated by at least one training symbol; and
   outputting a wireless transmission signal in accordance with the block of symbols over the wireless communication channel.

2. The method of claim 1, wherein forming each of the blocks of training symbols comprises:
   determining a length of the wireless communication channel;
   forming the first block of zero symbols to include L zero symbols, where L is selected as a function of the length of the wireless communication channel; and
   forming the second block of zero symbols to include the L zero symbols.

3. The method of claim 1, wherein outputting the wireless transmission signal comprises outputting the blocks of training symbols with power $P(1-\alpha)$ and outputting the information-bearing symbols with power $\alpha P$, where P represents a power of the wireless transmission signal and $\alpha$ is a ratio of power output to the information-bearing symbols to power output to the wireless transmission signal.

4. The method of claim 3, wherein $\alpha=\frac{1}{2}$.

5. The method of claim 1, wherein outputting the wireless transmission signal comprises outputting the blocks of training symbols with power $P(1-\alpha)$ and outputting the information-bearing symbols with power $\alpha P$, where P represents a power of the wireless transmission signal and $\alpha$ is a function of a number of the information-bearing symbols and a length of the wireless communication channel.

6. The method of claim 1, wherein outputting the wireless transmission signal comprises:
   outputting each of the blocks of training symbols with an equal total power $P_1$ for each of the blocks of training symbols; and
   outputting each of the information-bearing symbols with equal power $P_2$.

7. The method of claim 6, wherein outputting each of the blocks of training symbols comprises outputting the training symbols with equal power for each of the training symbols.

8. A method comprising:
   receiving a wireless transmission signal transmitted from a block of symbols over a wireless communication channel, wherein the block of symbols comprises at least two blocks of training symbols of two or more training symbols, the blocks of training symbols separated by at least one information-bearing symbol, wherein the block of symbols comprises at least Q blocks of training symbols, where Q is a function of a delay-Doppler spread factor of the wireless communication channel, wherein each of the blocks of training symbols includes a first block of zero symbols and a second block of zero symbols, and wherein the first block of zero symbols and the second block of zero symbols are separated by at least one training symbol;
   estimating, by a channel estimation unit of a communication device, the wireless communication channel based on the blocks of training symbols within the received signal; and
   outputting estimated symbols based on the estimate of the wireless communication channel.

9. The method of claim 8, wherein estimating the wireless communication channel comprises forming a linear minimum mean-square error estimate of the wireless communication channel.

10. A wireless communication device comprising:
a block forming unit to form a block of symbols that includes at least two blocks of training symbols separated by at least one information-bearing symbol, wherein each block of training symbols has two or more training symbols, and wherein the block forming unit forms each of the blocks of training symbols to include a first block of zero symbols and a second block of zero symbols, wherein the first block of zero symbols and the second block of zero symbols are separated by at least one training symbol; and
a pulse shaping unit to output a wireless transmission signal in accordance with the block of symbols over a wireless communication channel,
wherein the block forming unit forms the block of symbols by determining a delay-Doppler spread factor of the wireless communication channel and forming the block of symbols to comprise at least Q blocks of training symbols, where Q is a function of the delay-Doppler spread factor of the wireless communication channel.

11. The wireless communication device of claim 10, wherein the block forming unit forms each of the blocks of training symbols by:
determining a length of the wireless communication channel;
forming the first block of zero symbols to include L zero symbols, where L is selected as a function of the length of the wireless communication channel; and
forming the second block of zero symbols to include the L zero symbols.

12. The wireless communication device of claim 10, wherein the pulse shaping unit outputs the wireless transmission signal by outputting the blocks of training symbols with power $P(1-\alpha)$ and outputting the information-bearing symbols with power $\alpha P$, where P represents a power of the wireless transmission signal and $\alpha$ is a ratio of power output to the information-bearing symbols to power output to the wireless transmission signal.

13. The wireless communication device of claim 12, wherein $\alpha = \frac{1}{2}$.

14. The wireless communication device of claim 10, wherein the pulse shaping unit outputs the wireless transmission signal by outputting the blocks of training symbols with power $P(1-\alpha)$ and outputting the information-bearing symbols with power $\alpha P$, where P represents a power of the wireless transmission signal and $\alpha$ is a function of a number of the information-bearing symbols and a length of the wireless communication channel.

15. The wireless communication device of claim 10, wherein the pulse shaping unit outputs the wireless transmission signal by:
outputting each of the blocks of training symbols with an equal total power $P_1$ for each of the blocks of training symbols; and
outputting each of the information-bearing symbols with equal power $P_2$.

16. The wireless communication device of claim 15, wherein the pulse shaping unit outputs each of the blocks of training symbols by outputting the training symbols with equal power for each of the training symbols.

17. The wireless communication device of claim 10, wherein the wireless communication device comprises a mobile device or a base station.

18. The wireless communication device of claim 10, wherein the wireless communication device comprises a digital signal processor that executes the block forming unit.

19. A wireless communication device comprising:
one or more antennas that receive a wireless transmission signal transmitted from a block of symbols over a wireless communication channel, wherein the block of symbols comprises at least two blocks of training symbols of two or more training symbols, the blocks of training symbols separated by at least one information-bearing symbol, wherein the block of symbols comprises at least Q blocks of training symbols, where Q is a function of a delay-Doppler spread factor of the wireless communication channel, wherein each of the blocks of training symbols includes a first block of zero symbols and a second block of zero symbols, and wherein the first block of zero symbols and the second block of zero symbols are separated by at least one training symbol;
a channel estimation unit to estimate the wireless communication channel based on the blocks of training symbols within the received wireless transmission signal; and
a symbol detection unit to output estimated symbols based on the estimate of the wireless communication channel.

20. The wireless communication device of claim 19, wherein the channel estimation unit estimates the wireless communication channel by forming a linear minimum mean-square error estimate of the wireless communication channel.

21. The wireless communication device of claim 19, wherein the wireless communication device comprises a mobile device or a base station.

22. A computer-readable storage medium embodying computer-readable instructions that cause a processor to:
form, by a block forming unit of a communication device, a block of symbols that includes at least two blocks of training symbols separated by at least one information-bearing symbol, wherein each block of training symbols has two or more training symbols, and wherein forming the block of symbols includes forming each of the blocks of training symbols to include a first block of zero symbols and a second block of zero symbols, the first block of zero symbols and the second block of zero symbols being separated by at least one training symbol; and
output a wireless transmission signal in accordance with the block of symbols over a wireless communication channel,
wherein the instructions that cause the processor to form the block of symbols comprise instructions that cause the processor to determine a delay-Doppler spread factor of the wireless communication channel and to form the block of symbols to comprise at least Q blocks of training symbols, where Q is a function of the delay-Doppler spread factor of the wireless communication channel.

23. The computer-readable storage medium of claim 22, wherein the first block of zero symbols comprises a first block of L zero symbols, wherein the second block of zero symbols comprises a second block of L zero symbols, and wherein L is selected as a function of a length of the wireless communication channel.

24. The computer-readable storage medium of claim 22, wherein the instructions that cause the processor to output the wireless transmission signal comprise instructions that cause the processor to output the blocks of training symbols with power $P(1-\alpha)$ and to output the information-bearing symbols with power $\alpha P$, where P represents a power of the wireless transmission signal and α is a ratio of power output to the information-bearing symbols to power output to the wireless transmission signal.

25. The computer-readable storage medium of claim 22, wherein the instructions that cause the processor to output the wireless transmission signal comprise instructions that cause the processor to:
output each of the blocks of training symbols with an equal total power $P_1$ for each of the blocks of training symbols; and
output each of the information-bearing symbols with equal power $P_2$.

26. The computer-readable storage medium of claim 25, wherein the instructions that cause the processor to output each of the blocks of training symbols comprise instructions that cause the processor to output the training symbols with equal power for each of the training symbols.

27. A computer-readable storage medium embodying computer-readable instructions that cause a processor to:
receive a wireless transmission signal transmitted from a block of symbols over a wireless communication channel, wherein the block of symbols comprises at least two blocks of training symbols of two or more training symbols, the blocks of training symbols separated by at least one information-bearing symbol, wherein the block of symbols comprises at least Q blocks of training symbols, where Q is a function of a delay-Doppler spread factor of the wireless communication channel, wherein each of the blocks of training symbols includes a first block of zero symbols and a second block of zero symbols, and wherein the first block of zero symbols and the second block of zero symbols are separated by at least one training symbol;
estimate, by a channel estimation unit of a communication device, the wireless communication channel based on the blocks of training symbols within the received wireless transmission signal; and
output estimated symbols based on the estimate of the wireless communication channel.

* * * * *

UNITED STATES PATENT AND TRADEMARK OFFICE
CERTIFICATE OF CORRECTION

| | |
|---|---|
| PATENT NO. | : 7,590,188 B2 |
| APPLICATION NO. | : 10/850825 |
| DATED | : September 15, 2009 |
| INVENTOR(S) | : Georgios B. Giannakis and Xiaoli Ma |

It is certified that error appears in the above-identified patent and that said Letters Patent is hereby corrected as shown below:

Column 1, Line 14, "Agent Grant No. 01-05612 awarded by the National Science" should read -- Agency Grant No. CCR-0105612 awarded by the National Science --

Column 1, Line 16, "Grant No. DAAD19-01-2-011 awarded by the Army" should read -- Grant No. DAAD19-01-2-0011 awarded by the Army --

Column 1, Line 17-18, "Research Lab (ARL/CTA). The Government may have certain rights in the invention." should read -- Research Lab (ARL/CTA). The Government has certain rights in the invention. --

Page 1 of 1

Signed and Sealed this

Eighth Day of December, 2009

David J. Kappos
*Director of the United States Patent and Trademark Office*

UNITED STATES PATENT AND TRADEMARK OFFICE
CERTIFICATE OF CORRECTION

PATENT NO. : 7,590,188 B2 Page 1 of 1
APPLICATION NO. : 10/850825
DATED : September 15, 2009
INVENTOR(S) : Giannakis et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1468 days.

Signed and Sealed this

Twenty-first Day of September, 2010

David J. Kappos
*Director of the United States Patent and Trademark Office*